US008488799B2

(12) United States Patent
Goldstein et al.

(10) Patent No.: US 8,488,799 B2
(45) Date of Patent: Jul. 16, 2013

(54) METHOD AND SYSTEM FOR SOUND MONITORING OVER A NETWORK

(75) Inventors: Steven Wayne Goldstein, Delray Beach, FL (US); Marc Boillot, Plantation, FL (US); Jason McIntosh, Sugar Hill, GA (US); John P. Keady, Boca Raton, FL (US)

(73) Assignee: Personics Holdings Inc., Boca Raton, FL (US)

( * ) Notice: Subject to any disclaimer, the term of this patent is extended or adjusted under 35 U.S.C. 154(b) by 940 days.

(21) Appl. No.: 12/555,570

(22) Filed: Sep. 8, 2009

(65) Prior Publication Data

US 2010/0142725 A1 Jun. 10, 2010

Related U.S. Application Data

(60) Provisional application No. 61/096,128, filed on Sep. 11, 2008.

(51) Int. Cl.
*H04R 29/00* (2006.01)

(52) U.S. Cl.
USPC ............ 381/56; 381/92; 381/122; 455/67.11; 455/115.3

(58) Field of Classification Search
USPC ................ 381/56, 57, 92, 94.7, 95, 122, 120, 381/317, 318, 320; 700/94, E19.001, E17.002, 700/231, 246, 251; 455/67.11, 67.12, 67.13, 455/67.14, 67.15, 67.16, 115.3, 115.4, 226.2, 455/423
See application file for complete search history.

(56) References Cited

U.S. PATENT DOCUMENTS

| | | | |
|---|---|---|---|
| 4,484,345 A * | 11/1984 | Stearns .......................... | 381/320 |
| 2001/0040969 A1* | 11/2001 | Revit et al. ...................... | 381/60 |
| 2003/0210184 A1* | 11/2003 | Apostolos ...................... | 342/192 |
| 2005/0052285 A1* | 3/2005 | Iriyama .......................... | 340/692 |
| 2005/0244013 A1* | 11/2005 | Battenberg et al. .............. | 381/57 |
| 2008/0159547 A1* | 7/2008 | Schuler et al. ................... | 381/56 |

* cited by examiner

*Primary Examiner* — Vivian Chin
*Assistant Examiner* — Leshui Zhang
(74) *Attorney, Agent, or Firm* — RatnerPrestia

(57) ABSTRACT

A mobile communication environment (100) can include a mobile device (160) to measure and send sound pressure level data. The mobile device (160) can initiate the collection of audio information responsive to detecting a trigger event. Mobile device (160) can measure or calculate the sound pressure level from the audio information. Metadata including time information and geographic location information can be captured with the collected audio information. Mobile device (160) can send the sound pressure level data and metadata through a wired or wireless communication path to a database (614).

23 Claims, 17 Drawing Sheets

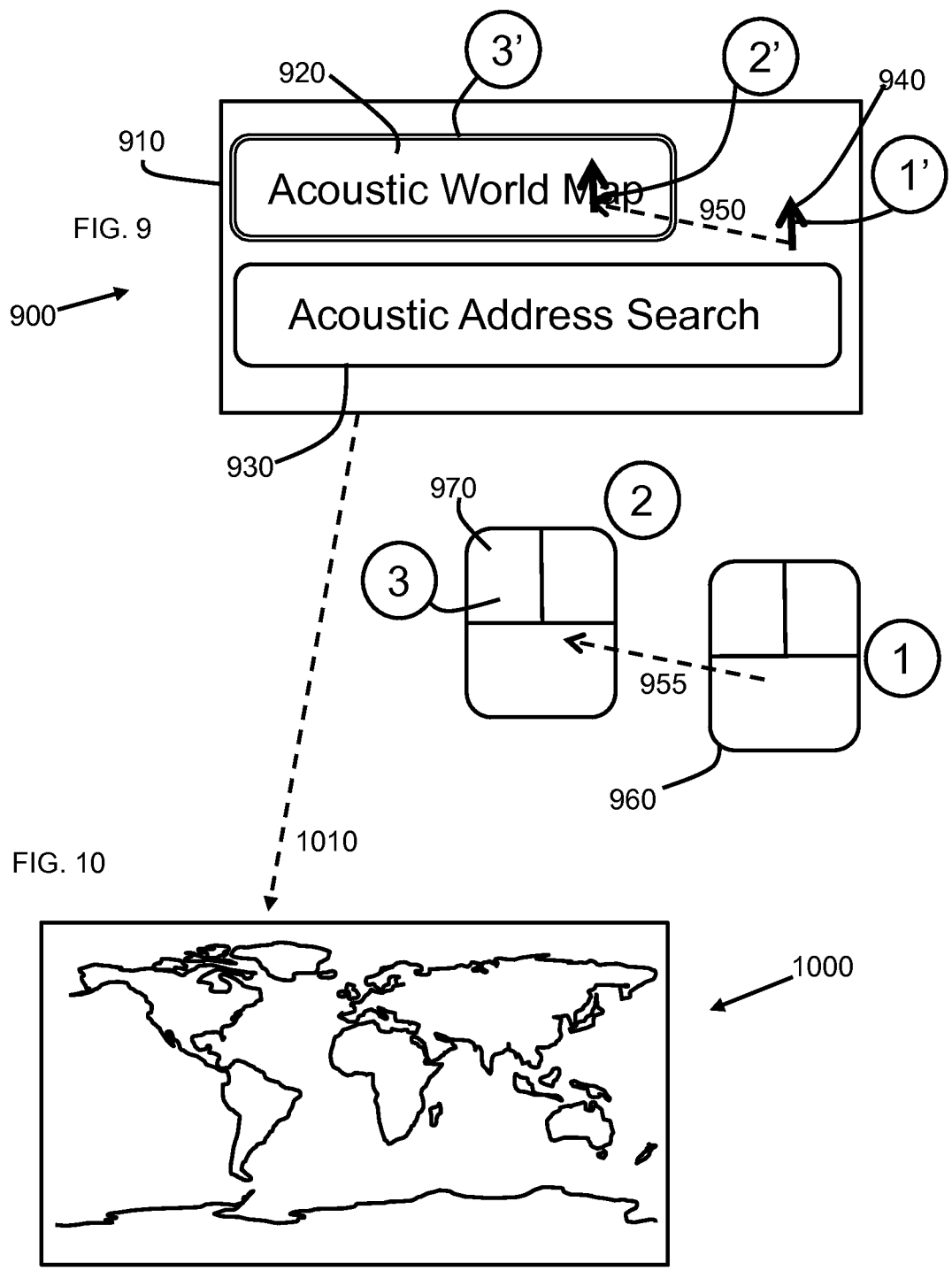

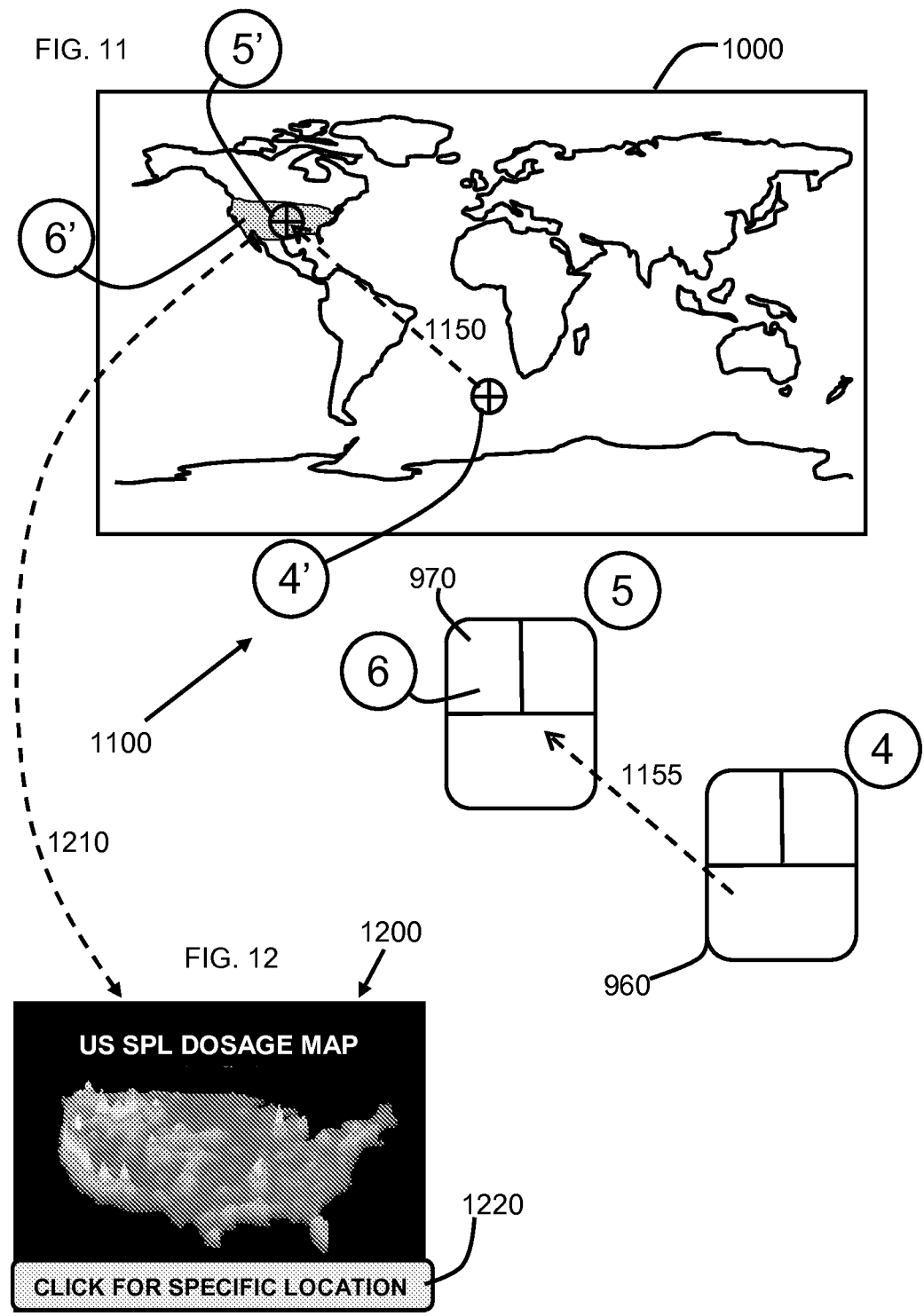

FIG. 12A
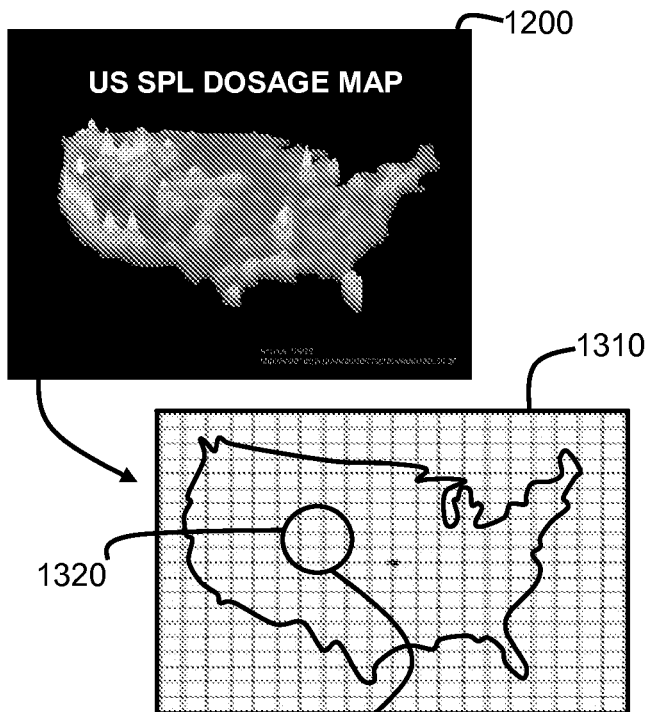
1200 US SPL DOSAGE MAP
1310
FIG. 12B
1320
FIG. 12C
1330
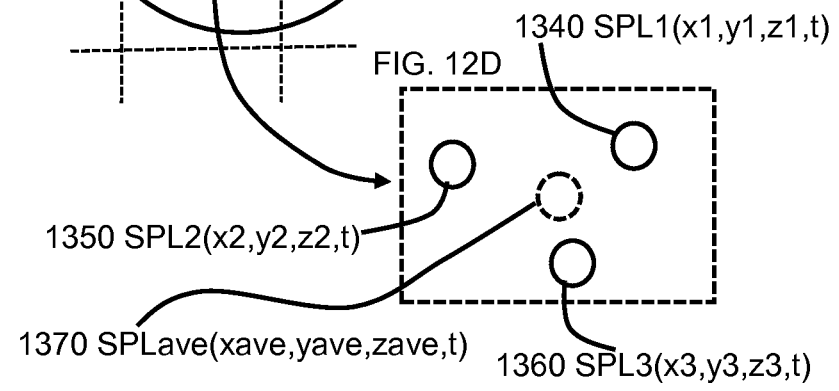
FIG. 12D
1340 SPL1(x1,y1,z1,t)
1350 SPL2(x2,y2,z2,t)
1370 SPLave(xave,yave,zave,t)
1360 SPL3(x3,y3,z3,t)

1840
Shape Legend
○ Real Time
△ Recorded

1855
Color Legend
Red- Exceeds SPL
Orange- Dangerous SPL
Yellow – Moderate SPL
Green – Safe SPL 1840
Shape Legend
○ Real Time
△ Recorded 1855
Color Legend
Red- Exceeds SPL
Orange- Dangerous SPL
Yellow – Moderate SPL
Green – Safe SPL

METHOD AND SYSTEM FOR SOUND MONITORING OVER A NETWORK

CROSS-REFERENCE TO RELATED APPLICATIONS

This application claims the benefit of U.S. provisional patent application No. 61/096,128 filed 11 Sep. 2008. The disclosure of which is incorporated herein by reference in its entirety.

FIELD OF THE INVENTION

The present invention relates to audio content management, and more particularly to sound pressure measurements using mobile devices for creating a database of sounds.

BACKGROUND

The ubiquity of portable electronic devices and mobile communication devices has increased dramatically in recent years. Mobile communication devices such as cell phones, portable media players, personal digital assistants (PDAs) are capable of establishing multimedia communication with other communication devices over landline networks, cellular networks, and, recently, wide local area networks (WLANs). Such devices are capable of distributing various forms of media to a general audience, such as digital multimedia files.

Images of the world have been shared and can be displayed with geographic and temporal tagging. Acoustically however the world has not been likewise mapped. Additionally the sonic toxicity of regions has not been mapped.

SUMMARY

People generally carry their mobile devices around with them everywhere in various environmental settings. In accordance with one embodiment, the mobile device can be used for capturing day to day, significant, or unusual sounds that occur. The various sounds can be collected and stored in a database to provide significant historical, scientific, and social benefit.

At least one exemplary embodiment is directed to a method of using a mobile device comprising the steps of: receiving acoustic information from a microphone of a mobile device; converting a signal from the microphone corresponding to the acoustic information to a digital signal; configuring audio processing of the acoustic information; calculating a sound pressure level from the digital signal; and providing metadata corresponding to the sound pressure level including time information and geographic information for identifying when and where the sound pressure level measurement was taken.

At least one exemplary embodiment is directed to a mobile device for measuring sound pressure levels comprising: a microphone; audio processing circuitry coupled to the microphone; and a processor operatively connected to the audio processing circuitry and microphone where the audio processing circuitry is bypassed when taking a sound pressure level measurement.

Embodiments of the invention are directed to a method and system for sound monitoring, measuring, reporting, and providing over a network using mobile devices. Sound reports can be generated that associate sound levels with a time and a location. The sound reports can then be shared with other network users.

BRIEF DESCRIPTION OF THE DRAWINGS

Exemplary embodiments of present invention will become more fully understood from the detailed description and the accompanying drawings, wherein:

FIG. 9 illustrates a simplified GUI that one can use to access sonic landscapes;

FIG. 10 illustrates a world map GUI in accordance with at least one exemplary embodiment;

FIG. 11 illustrates a user selecting a country using the world GUI in accordance with at least one exemplary embodiment;

FIG. 12 illustrates an SPL dosage contour map in accordance with at least one exemplary embodiment;

FIGS. 12A-12D illustrate the process of calculating an average sound pressure level (SPL) associated with a geographic region and combining average values to obtain pixel related SPL values in accordance with at least one exemplary embodiment;

DETAILED DESCRIPTION

Figure 1:
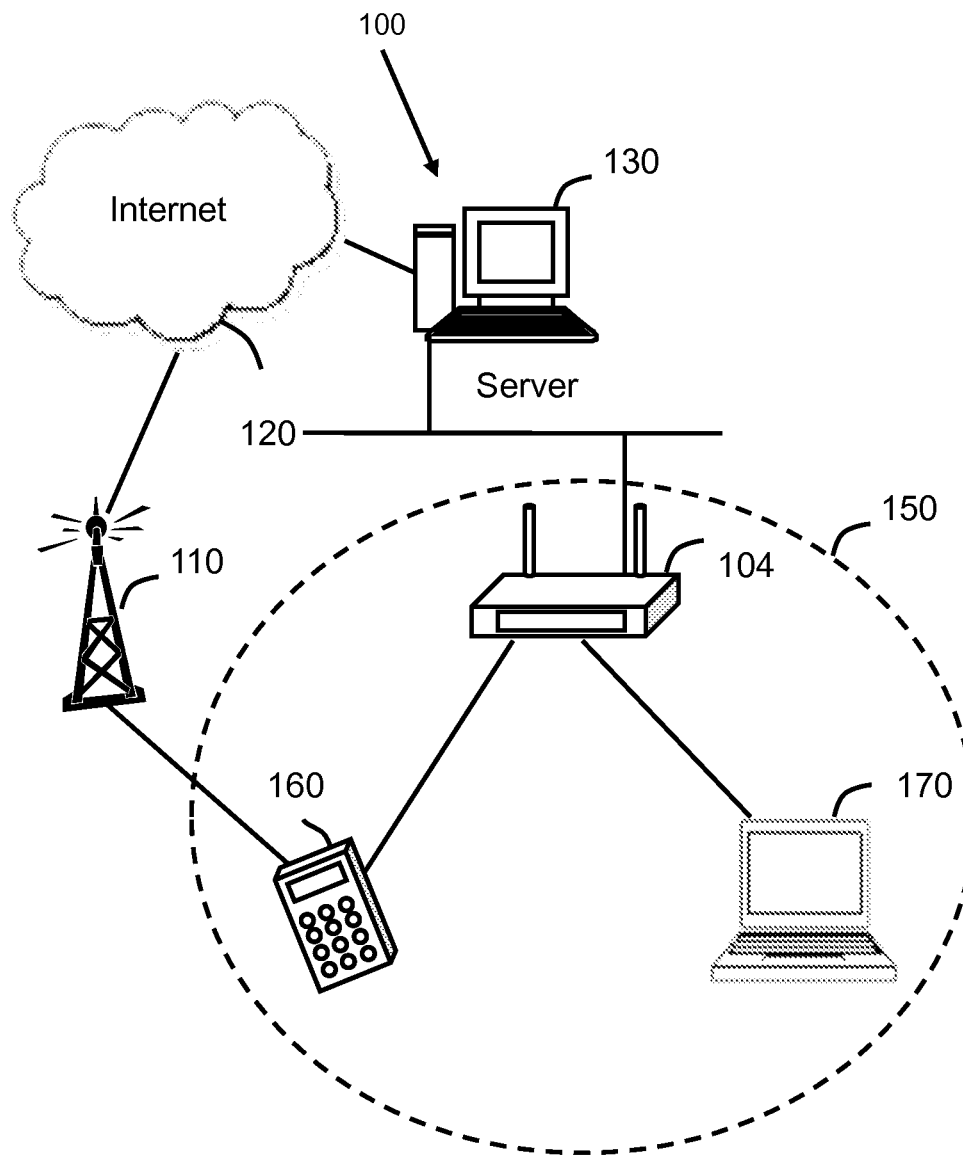
FIG. 1 illustrates a mobile communication environment.

The following description of exemplary embodiment(s) is merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example specific computer code may not be listed for achieving each of the steps discussed, however one of ordinary skill would be able, without undo experimentation, to write such code given the enabling disclosure herein. Such code is intended to fall within the scope of at least one exemplary embodiment.

Notice that similar reference numerals and letters refer to similar items in the following figures, and thus once an item is defined in one figure, it may not be discussed or further defined in the following figures.

In all of the examples illustrated and discussed herein, any specific values provided, should be interpreted to be illustrative only and non-limiting. Thus, other examples of the exemplary embodiments could have different values.

Referring to FIG. 1, a mobile communication environment 100 is shown. The mobile communication environment 100 can provide wireless connectivity over a radio frequency (RF) communication network or a Wireless Local Area Network (WLAN) between a number of devices simultaneously. Communication within the communication environment 100 can be established using a wireless, wired, and/or fiber optic connection using any suitable protocol (e.g., TCP/IP, HTTP, etc.). In one arrangement, a mobile device 160 can communicate with a base receiver 110 using a standard communication protocol such as CDMA, GSM, or iDEN. The base receiver 110, in turn, can connect the mobile communication device 160 to the Internet 120 over a packet switched link. The Internet 120 can support application services and service layers for providing media or content to the mobile device 160. The mobile device 160 can also connect to other communication devices through the Internet 120 using a wireless communication channel. The mobile device 160 can establish connections with a server 130 on the network and with other mobile devices 170 for exchanging data and information. The server can host application services directly, or over the Internet 120

The mobile device 160 can also connect to the Internet 120 over a WLAN. A WLAN links two or more communication devices using spread spectrum modulation methods. Wireless Local Access Networks (WLANs) can provide wireless access to the mobile communication environment 100 within a local geographical area. WLANs can also complement loading on a cellular system, so as to increase capacity. WLANs are typically composed of a cluster of Access Points (APs) 104 also known as base stations. The mobile communication device 160 can communicate with other WLAN stations such as the laptop 170 within the base station area 150. In typical WLAN implementations, the physical layer uses a variety of technologies such as 802.11b or 802.11g WLAN technologies, which can be coupled with repeaters to extend the normal communications range (10s of meters). The physical layer may use infrared, frequency hopping spread spectrum in the 2.4 GHz Band, or direct sequence spread spectrum in the 2.4 GHz Band. The mobile device 160 can send and receive data to the server 130 or other remote servers on the mobile communication environment 100.

The mobile device 160 can be a cell-phone, a personal digital assistant, a portable music player, a laptop computer, or any other suitable communication device. The mobile device 160 and the laptop 170 can be equipped with a transmitter and receiver for communicating with the AP 104 according to the appropriate wireless communication standard. In one embodiment of the present invention, the mobile device 160 is equipped with an IEEE 802.11 compliant wireless medium access control (MAC) chipset for communicating with the AP 104. IEEE 802.11 specifies a wireless local area network (WLAN) standard developed by the Institute of Electrical and Electronic Engineering (IEEE) committee. The standard does not generally specify technology or implementation but provides specifications for the physical (PHY) layer and Media Access Control (MAC) layer. The standard allows for manufacturers of WLAN radio equipment to build interoperable network equipment.

The mobile device 160 can send and receive media to and from other devices within the mobile communication environment 100 over the WLAN connection or the RF connection. In particular, mobile device 160 is adapted for measuring sound pressure levels, as will be disclosed herein below in greater detail. In at least one exemplary embodiment, mobile device 160 automatically measures sound pressure level and sends the measured sound pressure level to a database. Automating the process of collecting acoustic information will allow a global and time continuous database to be generated for mapping noise levels worldwide.

In one example, the mobile device 160 can connect to the server 130 for receiving or transmitting sound pressure levels to a database associated with server 130. The mobile device 160 can transmit and receive data packets containing audio, text, or video from the server 130 through a website hosted on the server 130. In general, the sound pressure level measurement and associated metadata requires only the transmission of a small amount of data. Sending the information can typically be done with little or no noticeable device performance loss to the user of mobile device 160. Alternately, the information can be provided to the database when mobile device 160 is idle thereby having no impact to the user. The server 130 can send media to the mobile device 160 for downloading audio content and associated information. Similarly, the mobile device 160 can communicate with the laptop 170 over a peer-to-peer network for receiving and transmitting audio content.

In at least one exemplary embodiment, mobile device 160 includes a location receiver that utilizes technology such as a GPS (Global Positioning System) receiver that can intercept satellite signals and therefrom determine a location fix of mobile device 160. In an alternate embodiment, location can be determined from a cell phone network. In either embodiment, mobile device 160 is adapted for providing a geocode or geographical location information corresponding to a location (or location over time) and attaching this information to an event such as a recording of acoustic information or measuring a sound pressure level measurement. Similarly, mobile device 160 has an internal clock for providing a time stamp or time information and attaching this information to the event.

Figure 1A:
FIG. 1A illustrates an example of a data packet that can be sent via a mobile device in accordance with at least one exemplary embodiment.

FIG. 1A illustrates a data packet containing a header, location information, time information, and SPL information.

Figure 2:
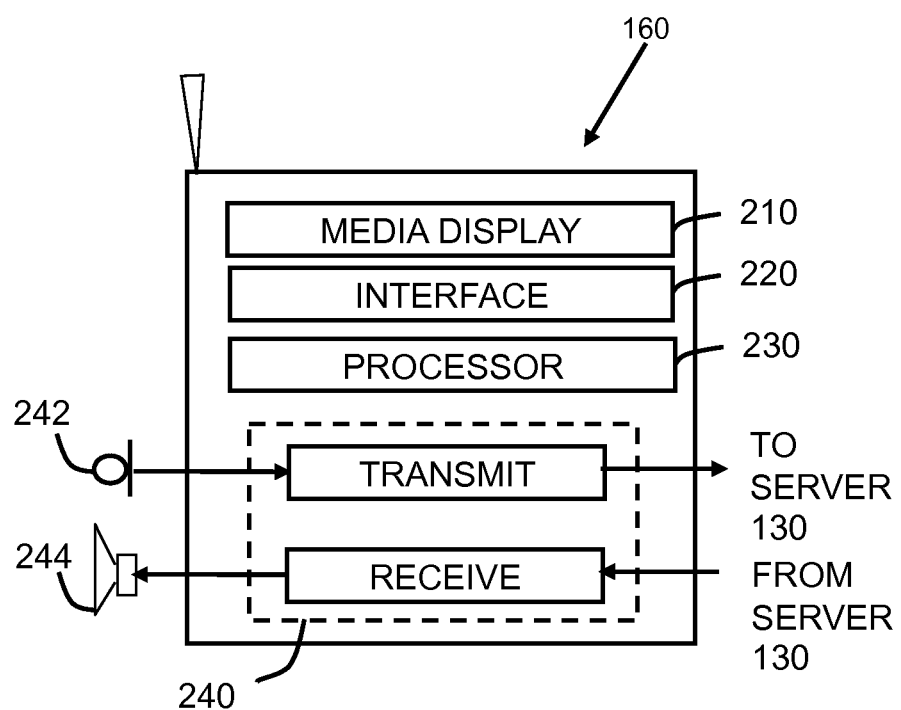
FIG. 2 illustrates a multimedia device in accordance with at least one exemplary embodiment.

Referring to FIG. 2, a mobile device 160 for sound monitoring and reporting is shown. The mobile device 160 can include a media display 210 for presenting one or more sound signatures, an interface 220 for capturing and submitting a segment of a media (including at least audio content) and creating a specification to the media, and a processor 230 for reporting the media in accordance with the specification. The term reporting is defined as any process associated with presenting or submitting an audio content of the media at least in whole or part to a system that analyzes the audio content. Audio content can be acoustic sounds captured within the user's environment or downloaded to the mobile device 160 by way of a wireless or wired connection. The process can include capturing a section of audio content or inserting a reference to a section of audio content. Rendering can include segmenting a sound signature from a captured audio recording, media clip, or video, tagging the sound signature with information (e.g., name of the source generating the sound—car horn, location—GPS coordinate, a date, and a sound capture direction). Alone or in combination, the audio content can also be geo-coded with a GPS location and time stamp.

The mobile device 160 can also include a communications unit 240 having a transmit module and receive module for receiving the media (or capturing live audio content via recording by microphone 242) and presenting the captured media or audio content to the server. The media or audio content may also be presented by mobile device 160 via speaker 244. The communication unit 240 can support packet data and establish a communication link to one or more media sources, such as the server 130, for providing a connection to a Universal Resource Indicator (URI), a hypertext transfer protocol (HTTP) address, or an Internet Protocol (IP) address. The processor 230 can be a microprocessor or DSP with associated memory for storing software code instructions that can perform signal processing functions for processing audio signals.

Figure 3:
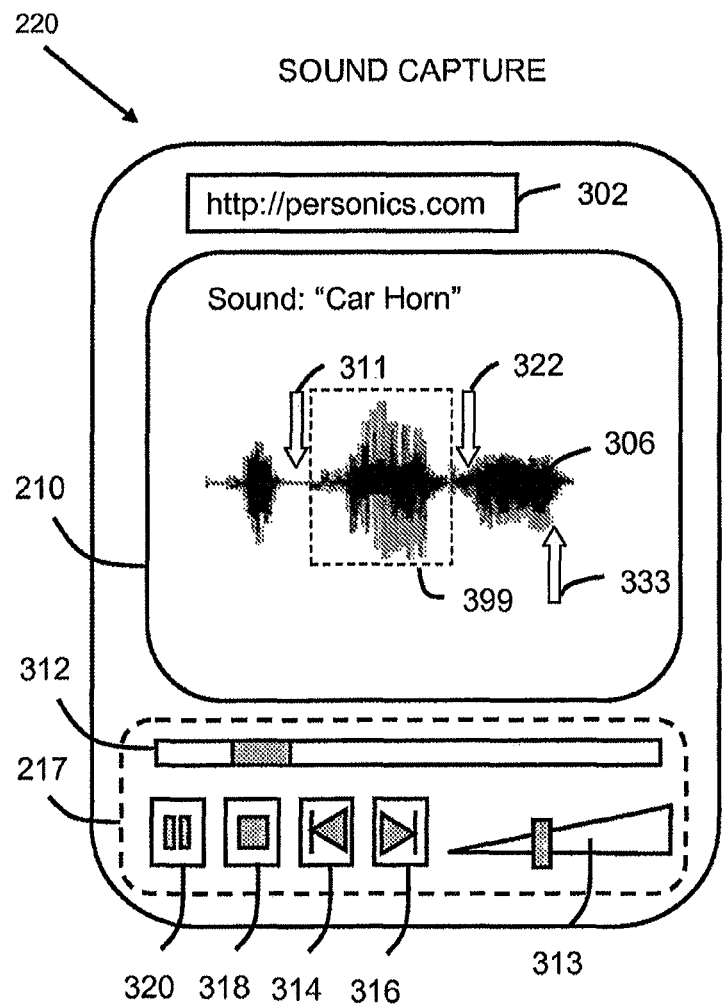
FIG. 3 illustrates an audio capture interface in accordance with at least one exemplary embodiment.

Referring to FIG. 3, the media display 210 and the interface 220 of the mobile device 160 of FIG. 1 are shown in greater detail for one exemplary embodiment. As illustrated, the interface 220 can include an address bar 302 for entering an address to upload the audio content, and a selector panel 217 for capturing and editing the audio content. The media display 210 can present the captured audio content in an audio format (shown) or video format (not shown). The selector 217 can include one or more compositional tools (314-320), or authoring tools, for editing the audio content. For example, the selector 217 can include an audio capture button 314, an end audio capture button 316, a save/insert audio content button 318, and a pause button 320. The save/insert button 318 can be used to capture an acoustic sound signal in the environment or an audio signal from a media source.

The interface 220 can also include a timer 312 for displaying a time of the audio content in the media. The timer 312 can include options for adjusting the media time resolution. For example, increasing or decreasing the duration of audio content presented on the media display 210. The timer can provide zooming functionality for adjusting a view of the audio content. For example, audio content 306 can be displayed as a time varying waveform that moves across the media display 210, as shown. The timer 312 can adjust the length of the audio presented in the media display 210. The timer 312 can also provide an estimate of a time length of an audio clip or video clip by numerically displaying the time. The selector panel 217 can also include a volume selector 313 for adjusting a volume of the audio content 306.

The media between the start time 311 and the end time 322 is the segmented audio content 399. The timer 312 provides a progress function which allows a user to identify a time line of the segmented audio content. The user can begin capture at the start time 311 by depressing the audio capture button 314, end capture at the end time 322 (prior to time 333) by depressing the end audio capture button 316, and save the audio capture segment by depressing the save/insert button 318. The saved audio segment 399 can be retrieved at a later time for analysis and review; for instance, to determine if the sound corresponds to any known sounds, such as a car horn, siren, vacuum cleaner.

It should also be noted that the mobile device can open up a voice communication channel to a server 130 and stream the captured audio to the server 130. The entire audio stream can then be analyzed at the server 130 to determine if any recognized sounds are present in the audio stream. The server 130, by way of manual or automatic intervention, can then send a message back to the mobile device 100 identifying the sounds recognized in the audio stream. For instance, the mobile device display can audibly state the recognized sound ("car horn detected") and/or present a text message for the recognized sound (e.g., car horn identified).

As one example, the user can enter in a Universal Resource Indicator (URI), a hypertext transfer protocol (HTTP) address, or an Internet Protocol (IP) address into the address bar 302 to send the audio content. The audio content can also be audio files, video files, or text clips that are downloaded over the air, instead of being captured in the user's acoustical environment. Embodiments are not limited to capturing audio content or audio content segments from only live recordings, but also other media received by the mobile device 160. Other media sources can be identified (peer to peer, ad-hoc) for providing audio segments and audio content. For instance, the user may receive a captured audio waveform from another user in their local vicinity by way of a wi-fi system.

Alternately, the entire process of capturing audio content, for example sound pressure level measurements can be automated such that minimal human intervention is required. In general, automating the capture and sending process would be more reliable, provide more diversity of audio content, and could be collected globally at all times of the day. In at least one exemplary embodiment, mobile device 160 includes a cyclical buffer for storing acoustic information received from a microphone 242 of mobile device 160. The buffer can be continuously over written with new information so it acts as short-term storage of audio content.

A trigger event is an event that initiates the collection of audio content or the measurement of sound pressure level that is sent to server 130 (or an associated database for storage). Examples of trigger events for mobile device 160 to collect audio content are the detection of a sound similar to a sound signature, a time window, geographic location, sound pressure level, and sensor data (biological, acceleration/velocity, odor, chemical detection, visual, etc.) to name but a few. For example, the duration of a detected signal can be a trigger event if the signal exceeds a predetermined duration.

The trigger event initiates the sending of audio content in the buffer to server 130. Alternately, the audio content can be moved to longer term storage than the cyclical buffer for sending at a later time. The audio content can undergo further processing in mobile device 160 using a microprocessor or DSP therein. For example, the sound pressure level can be calculated from the captured audio content. The amount of audio content captured around the trigger event can be varied to ensure the capture of the entire sound signal or be of a fixed time period depending on the requirements. The storing of the audio content or sound pressure levels allows mobile device 160 to send the content at an appropriate time when a communication path is opened between the mobile device 160 and server 130. The audio content can also be compressed to reduce data transmission requirements.

Other means for transmitting and receiving audio content segments over the Internet are herein contemplated, and are not limited to the address scheme provided. For example, the mobile device 160 can receive media from one or more peers or live audio/video recording sessions through communication ports or interfaces. In one aspect, streaming media can be provided through an open communication connection from the server 130 to the mobile device. The communication path can stay open while packets of data are streamed over the connection with the mobile device 160. For example, the mobile device 160 can open a socket connection to the server 130 for transmitting or receiving streaming media and processing the data as it is received.

Figure 4:
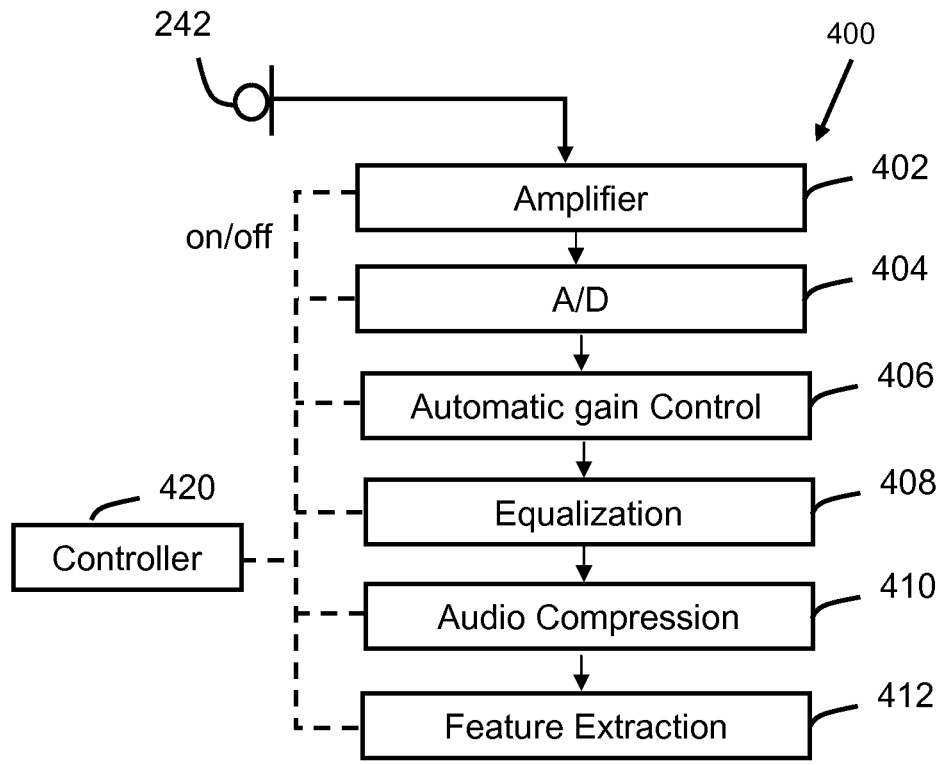
FIG. 4 illustrates a block diagram of a front end processor configuration in accordance with at least one exemplary embodiment.

Referring to FIG. 4, an exemplary front end processor configuration 400 is shown. The configuration 400 can correspond to the audio path line up of audio processing modules for capturing and recording audio content. The modules can exist in hardware or software. The entire configuration 400 is not limited to the order shown and can function in a different order if required. For instance, the Automatic Gain Control (AGC) 406 if in hardware, can precede the A/D 404. It can also follow the A/D 404 if implemented in software.

Figure 5:
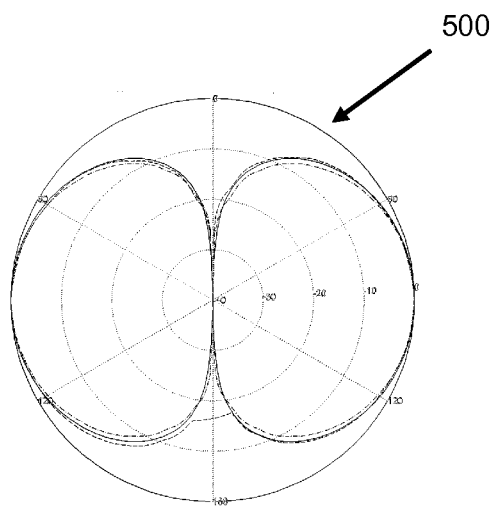
FIG. 5 illustrates a directional plot of a microphone pickup in accordance with at least one exemplary embodiment.

As illustrated, an acoustic signal can be captured by the microphone 242 and converted to an analog signal. The microphone 242 can have a specific directional pattern. As an example, one directional pattern 500 is shown in the bode plot of FIG. 5. Notably, the microphone sensitivity can also affect the frequency dependent sound pressure level. The physical shape of the mobile device and its body size can affect the received sound. The microphone directional pattern, the physical shape of the mobile device, microphone sensitivity, microphone porting, and any baffling is compensated for when calculating sound pressure level.

In at least one exemplary embodiment, the microphone 242 is an omni-directional microphone. Although not shown in FIG. 4, the microphone 242 can also have an extendable boom to keep the microphone 242 away from the body of the mobile device 160 to permit omni-directional pick-up. Alternately, a motor can actively move the microphone 242 from the body of the device 160 when sound pressure level is measured. Extending the microphone 242 from the body of the mobile device 160 can help mitigate the body from the shadowing of acoustic sounds at high frequencies. The microphone 242 can also include a felt covering to keep dirt out that attenuates the sound. The felt can also affect the microphone polarization and should be compensated for in calculating sound pressure level.

The analog signal can be amplified by the amplifier 402 to increase the dynamic range to match the input range of the analog to digital (A/D) converter 404. In one arrangement, the A/D converter 404 can be a 13-bit ADC with a dynamic range of 66 dB. Alternatively a 24-bit ADC can be used to have a 132 dB dynamic range. The ADC can also support variable sampling rates, for instance, sampling rates of 8, 16, 32 and 44.1 KHz. The ADC can also be configured to adjust the sampling rate during audio acquisition to permit variable sampling rate conversion.

Upon converting to a digital signal, the automatic gain control 406 can further condition the audio signal to control variations in the gain. The AGC 406 can also include noise suppression, gain shaping, compression, or other aspects of gain control. An equalization module 408 (also referred to herein as equalizer 408) can equalize the audio signal to compensate for any variations in the audio path configuration and/or to condition the frequency response to fall within a predetermined mask. For instance, mobile device manufacturers generally have a SPL frequency dependent mask for a particular product based on the acoustic porting characteristics or audio components of the mobile device. An optional audio compression module 410 can compress the audio signal for purposes of data reduction (e.g. audio coding, audio compression). A feature extraction module 412 (also referred to herein as feature extractor 412) can extract one or more salient features from the audio signal. For instance, the feature extractor 412 for voice signals, may extract linear prediction coefficients, mel cepstral coefficients, par cor coefficients, Fourier series coefficients.

The controller 420 (microprocessor or DSP) can selectively enable or disable the various modules in the audio configuration path. For instance, upon a user directive, the controller 420 can bypass one or more of the modules so as to prevent the modules from processing the audio signal. The controller 420 can also retrieve module configuration data from the modules for determining how the audio signal is processed by the module. For instance, the AGC 406 can provide an attack time, a decay time, a compression curve, and other parametric information related to processing the audio signal. In such regard, the controller 420 can then pass this information on to the server 130 with the captured audio content to permit the server 130 to evaluate the original characteristics of the acoustic signal. The parameters and associated enable/disable flags can be stored in a code plug managed by the controller 420 that can be shared with other devices. The code plug also permits customization for operation of the audio processing modules (402-412) of the mobile device 160.

Figure 6:
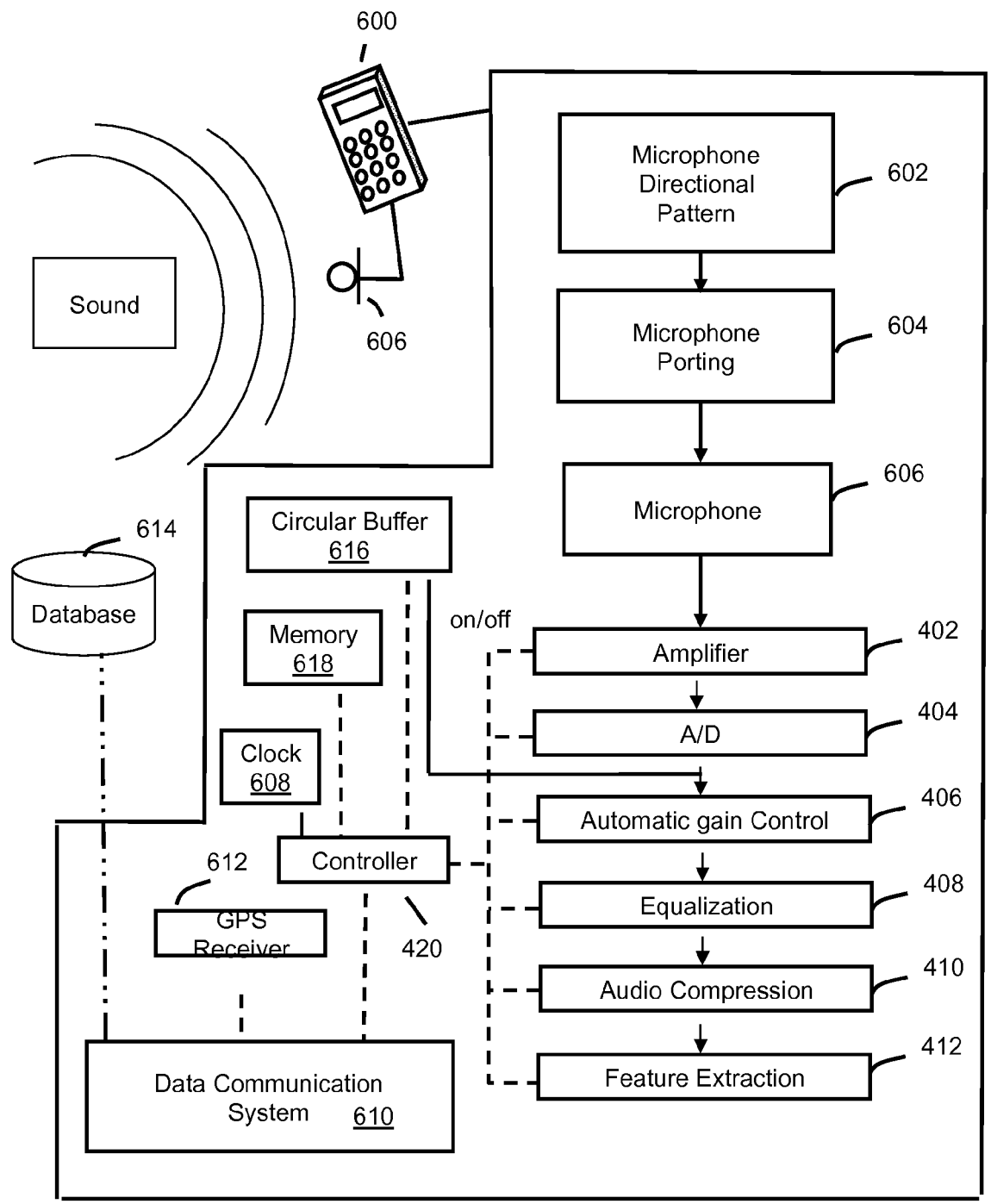
FIG. 6 illustrates a block diagram of a mobile communication device in accordance with at least one exemplary embodiment.

FIG. 6 is a block diagram of a mobile device 600 for measuring and sending sound pressure levels in accordance with an exemplary embodiment. In general, mobile device 600 is designed for communication purposes. Mobile device 600 has a microphone 606 and a speaker (not shown) for providing two-way communication. Microphone 606 is often in a fixed location within a housing of mobile device 600. Microphone porting 604 acoustically couples microphone 606 for receiving sound external to the housing of mobile device 600. Microphone porting 604 is often an acoustic channel that connects microphone 606 (located internally in the housing) to an external port. A screen or cover may also be employed at the external port to prevent foreign material from entering into microphone porting 604. In at least one exemplary embodiment, mobile device 600 can have multiple microphones for averaging sound pressure level measurements. Moreover, people do not always keep their phone out in the open but have them on or in holsters and pockets. Multiple microphones increase the probability when automatically collecting audio content that an unobstructed microphone is available for receiving the information.

Any change in the sound or signal that occurs due to components of mobile device 600 is accounted for thereby maintaining the integrity of the sound pressure level measurement. Ideally, the signal from microphone 606 exactly represents the sound. Even under the best of conditions this does not occur. For example, depending on the location of microphone 606 on mobile device 600 reflections of an acoustic signal off of the housing can increase or decrease the sound pressure level measurement. In at least one exemplary embodiment, mobile device 600 has a boom microphone that can be extended away from the housing to minimize this issue or has a motorized microphone that extends from the housing when a sound pressure level is measured. The characteristics of microphone directional pattern 602, microphone porting 604, amplifier 402, and device housing as it relates to modifying a received acoustic signal are compensated for when measuring or calculating sound pressure level. Periodic calibration of mobile device 600 against a reference would be beneficial to ensure the accuracy of measurements.

Automatic gain control 406, equalization 408, audio compression 410, and feature extraction 412 comprise circuitry for processing an audio signal in mobile device 600. In at least one exemplary embodiment, audio processing of the audio signal is bypassed to prevent further modification to the signal. Alternately, audio processing of the signal could be compensated for in the measurement or calculation of the sound pressure level. Having controller 420 disable or turn off audio processing circuitry when sound pressure level measurements are being performed is one form of audio bypassing. Also, the audio signal from microphone 606 can be brought out as an analog signal from amplifier 402 or as a digital signal from A/D converter 404 before any audio processing occurs. The coupling of the analog signal or the digital signal can be controlled via a switch under the control of controller 420. For example, an analog signal from an output of amplifier 402 or microphone 606 is provided to a dedicated circuit for measuring sound pressure level under the control of controller 420. Controller 420 enables the circuit for measuring a sound pressure level over a predetermined time period and the result stored in memory 618 for sending to database 614 when a communication path to database 614 is opened.

In at least one exemplary embodiment, the digital signal from A/D converter 404 is provided to circular buffer 616. Audio processing circuitry is bypassed to minimize modification to the audio signal provided by microphone 606. Circular buffer 616 is under control of controller 420. Circular buffer 616 continuously stores a converted digital signal corresponding to acoustic information received by microphone 606. Circular buffer 616 stores a predetermined amount of acoustic information that overwrites the oldest data with the new incoming data. Characteristics of amplifier 402 including gain are taken into account in the measurement or calculation of sound pressure level.

In general, a user of mobile device 600 can manually enable the device for measuring a sound pressure level. Typically, the measurement will occur over a predetermined time period after the device is enabled for measuring. Audio content in circular buffer 616 corresponding to the predetermined time period of the measurement is transferred from buffer 616 to controller 420 or memory 618. Controller 420 can process the digital signal and calculate the sound pressure level, attach metadata, and store the SPL, digital signal (if desired), and metadata in memory 618. The user can further add to the metadata such as the type of sound or other relevant information. Alternately, the digital signal can be stored in memory 618 along with corresponding metadata. Controller 420 can then calculate and store the sound pressure level at a later time.

In at least one exemplary embodiment, mobile device 600 automatically collects sound pressure levels and sends the measured sound levels to database 614 with minimal or no human intervention. A trigger event is an event that initiates the measurement of a sound pressure level. A trigger event using sound pressure level will be used to illustrate this process in the next figure. Examples of events that are used to trigger the collection of a sound pressure level are sound pressure level, time, geographic location, sound signature detection, biological data, acceleration/velocity data, temperature, visual/chroma data, odor (smell), atmospheric data (barometric pressure, wind speed, humidity, etc.), chemical detection, to name but a few.

The digital signal of the acoustic information that triggered the collection of the sound pressure level measurement is identified for being processed by controller 420 or moved from buffer 616 to longer-term memory 618. It should be noted that the window of time of the acoustic information required for SPL measurement can precede and extend beyond the trigger event. The appropriate time span of the digital signal is retrieved from circular buffer 616 and may include more than one complete downloading from buffer 616 to capture all of the acoustic information for measurement. As mentioned previously, controller 420 can process the digital signal as soon as it is received to calculate the sound pressure level or store the digital signal to memory 618 for processing at a later time.

Metadata is attached to the digital signal (if collected) and the sound pressure level measurement to aid in the identification and classification of the acoustic information. Included with the metadata is time information and geographic position information. The time information or time stamp of when the time line of the digital signal is provided by a clock 608 that is operably coupled to controller 420. The geographic position information or geocode of the location of mobile device 600 during the digital signal is provided by GPS receiver 612 that is configured operably with data communication system 610 and controller 420.

In at least one exemplary embodiment, measured sound pressure levels and their associated metadata can be stored in memory 618. In general, SPL data and metadata will use substantially less memory relative to storing acoustic information. Once the SPL data and metadata is available, controller 420 in cooperation with data communication system 610 can open a communication path to database 614 for uploading the information. Alternately, a queue of SPL data, audio content (if needed), and metadata could be stored in memory 618 over time and mobile device 600 opens a communication path to database 614 and uploads the information at a time when it does not interfere with the user of device 600.

Figure 7A:
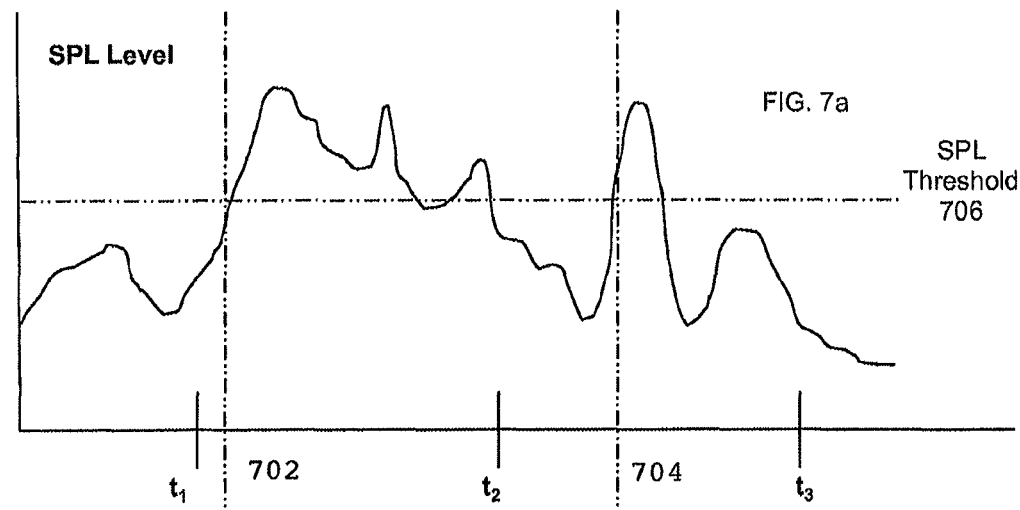
FIGS. 7a-c illustrates a trigger event for measuring a sound pressure level in accordance with at least one exemplary embodiment.
Figure 7B:
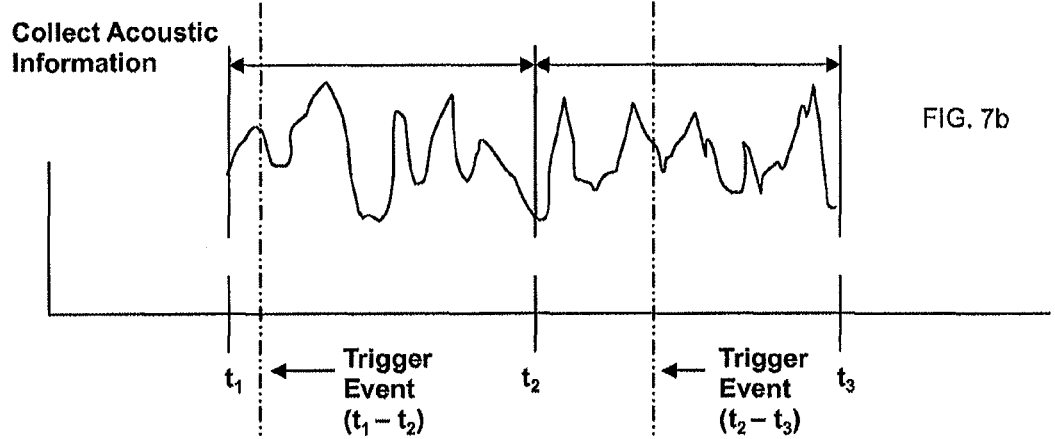
Figure 7C:
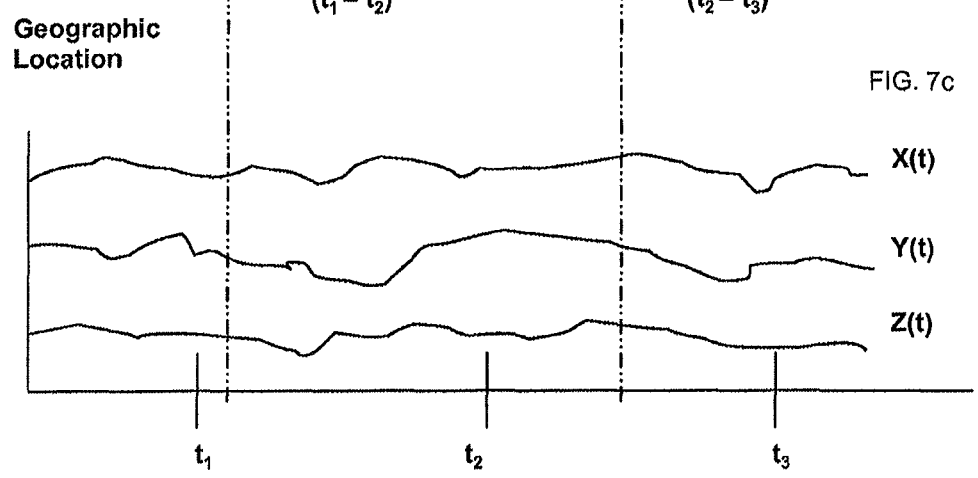

FIGS. 7a-7c are related diagrams illustrating the use of sound pressure level as a trigger event for collecting acoustic information in accordance with the exemplary embodiment. FIGS. 7a-7c relate to a trigger event for mobile device 600 of FIG. 6. Referring to FIG. 6, a mobile device 600 is receiving audio information through the microphone 606 of the device. In at least one exemplary embodiment, the acoustic information is stored in buffer 616 of mobile device 600 for analysis. The analysis can include looking for a trigger event such as sound pressure level. The trigger event could also comprise an AND function with one or more other trigger events to initiate collection of audio content or an OR function that initiates collection of audio content when any one of a variety of trigger events is detected.

Referring to FIG. 7a, a graph of sound pressure level versus time is shown that is measured or calculated by mobile device 600 from the audio content in buffer 616. A trigger event occurs when the sound pressure level of the acoustic information exceeds sound pressure level threshold 706. For example, information on high noise areas is being collected. Setting sound pressure level threshold 706 at 70 dB would collect information in areas having a sound pressure level that could produce hearing loss over a sustained period of time. Collecting a large number of data points would allow the mapping of acoustic information over a three dimensional region and over time. This information would have a variety of uses one of which is identifying when and where a person is exposed to potential harmful sound levels in the city.

At trigger event 702, the sound pressure level of the audio content is equal to or greater than a sound pressure level threshold 706. Trigger event 702 occurs during a time period $t_1$-$t_2$ as indicated by the dashed line. Once triggered, the acoustic information, as shown in FIG. 7b, during time period $t_1$-$t_2$ is collected for sending to a database. The acoustic information can be immediately processed/sent or stored in memory of the communication device in its entirety or converted to a more compact form, modeled, characterized, and provided with metadata depending on the collection needs. Included in the metadata is the time information ($t_1$-$t_2$) and geographic position information associated with when and where the acoustic information was captured. Controller 420 can calculate a sound pressure level measurement from the acoustic information ($t_1$-$t_2$) based on the collection need. For example, average or peak sound pressure measurements could be calculated over the entire time period or portions of the time period.

Referring to FIG. 7c, the position of the communication device indicated in x, y, and z coordinates versus time is indicated in the graph provided by GPS receiver 612. The GPS information could also be provided periodically. Interpolation (linear, other) could be used to estimate location versus time. A single geographic location could also be used for brevity depending on need. Thus, the position of the mobile device 600 can be static or moving over time and this information is provided with the collected acoustic information.

Similarly, a second trigger event 704 is illustrated in FIG. 7a. The acoustic signal is equal to or greater than sound pressure level 706 at trigger event 704 during time period $t_2$-$t_3$. The acoustic information, as shown in FIG. 7b is similarly collected and sound pressure level calculated as disclosed hereinabove.

In the example, a trigger event occurs anytime the sound pressure level threshold 706 is exceeded. The trigger event could be modified in other ways. For example, the sound pressure level above threshold 706 for a predetermined time period could be a trigger event or a change in sound pressure level above a predetermined amount could also be a trigger event. Furthermore, the acoustic information collected is not limited to the time period in which the trigger event occurs. The amount of acoustic information collected can be varied based on need. For example, collecting only acoustic information that exceeds sound pressure level threshold 706. Conversely, a trigger event could collect the acoustic information from the previous, current, and next time period depending on the size of buffer 616. As disclosed previously, the sound pressure level, metadata, and other information could be sent immediately by mobile device 600 or later at a more opportune time to database 614.

Figure 8:
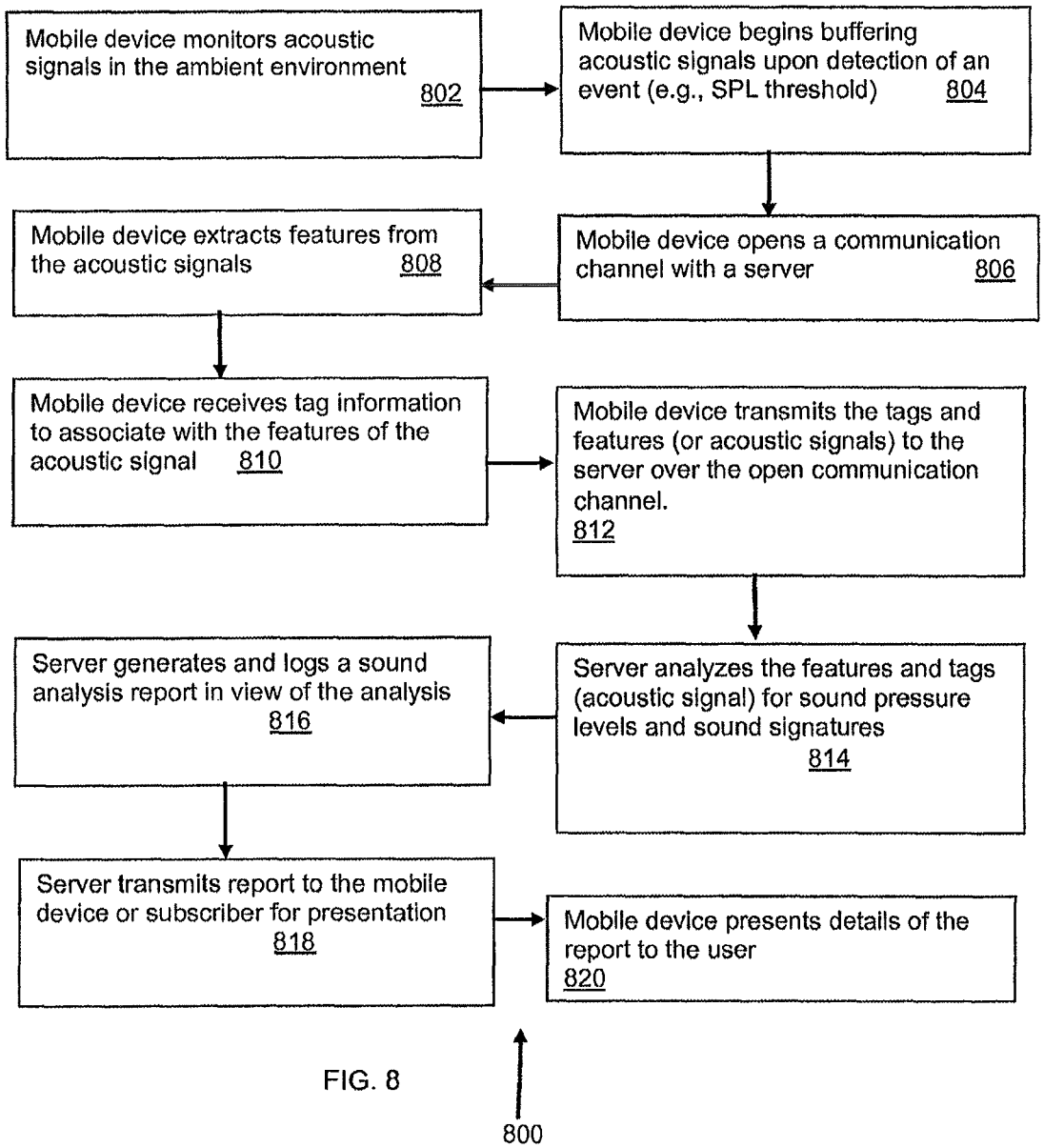
FIG. 8 illustrates a method for sound monitoring, measuring, and reporting over a network using mobile devices in accordance with at least one exemplary embodiment.

Referring to FIG. 8, an exemplary method 800 for sound monitoring and reporting over a network using mobile devices is shown. The method 800 can include more or less than the number of steps shown and is not limited to the order of the steps shown. The method 800 can be implemented by the components of the mobile device shown in FIG. 4.

At step 802, the mobile device monitors acoustic signals in the ambient environment. The mobile device microphone can actively analyze acoustic signals in the environment and begin processing of the acoustic signals upon detection of a trigger event. In at least one exemplary embodiment, mobile device 160 begins buffering the acoustic signals in a step 804 when a trigger event occurs. Alternately, the acoustic signals can already be stored on a cyclical buffer. For instance, the processor can monitor changes in the Sound Pressure Level, and upon detection of a significant change in SPL, begin to save the associated audio signals to memory. The event can also be user initiated, for instance, if the user hears a sound in the environment and then hits the record button on the user interface. It should also be noted that in another embodiment the mobile device can prompt the user to begin recording if a sound signature is detected within the acoustic signal. In this case, the mobile device continually monitors and analyzes the acoustic signal for salient information, such as a warning sound of a siren, in the user's environment.

The trigger event initiates the mobile device 160 to proceed to open a communication channel with the server 130 in a step 806. As previously indicated, the connection can be a voice channel, a data channel, a packet data channel, a wi-fi channel, or any other communication link. In one arrangement, the mobile device 160 can send the captured audio signal directly over the voice channel. For instance, the data can be sent in raw PCM format over the voice channel, or a non-lossy compression format to preserve the original signal characteristics. Upon opening the channel, the mobile device 160 can also send the code-plug information (see FIG. 4) identifying the parameter settings of the audio configuration path line-up.

In step 808, mobile device 160 extracts features from the acoustic signals. For instance, as previously described, the processor 230 can extract mel-cepstral coefficients from the audio signal. The feature extraction also serves to reduce the data size required in representing the audio signal. For instance, 10 ms frames sizes at fs=8 KHz translates to 160 samples and the 10 ms frame size can be represented with as few as 10-14 mel-cepstral coefficients. It should be noted however, that the non-lossy compressions can also be performed on the audio signals to lower the data dimensionality but without compromising reconstructed audio signal integrity. Lossy compression can also be performed on the data to further reduce the data representation size.

Alternately, processor 230 bypasses the audio processing circuitry and calculates the sound pressure level using the bypassed signal from the microphone. The calculation includes compensation for aspects of mobile device 160 such as the microphone characteristics, microphone porting, foreign material coverings, amplifiers, and other audio processing circuitry. Alternately, the microphone signal is coupled to a dedicated circuit for measuring sound pressure level and provided to processor 230 for further processing.

Metadata or tag information is generated and automatically attached with the features or acoustic signals. Included with the metadata are time information and geographic location information identifying when and where the acoustic signals were collected. The process can also include manually attached tags related to the audio content. The tag can include identifying information such as the type of sound (e.g., car horn, siren, whistle, bell, jack hammer, etc), more information related to the location of the capture (e.g., restaurant name, home address, etc.), a direction of the sound (e.g., moving closer, departing, stationary), and any associated description of the sound (e.g., faint sound, very loud, annoying, pleasant, etc.). At step 810, the mobile device receives the tag information and associates it with the features of the acoustic signal, or alternatively the actual captured audio signal.

At step 812, the mobile device transmits the tags and features (or acoustic signals) to the server 130 over the open communication channel. The acoustic signals and tags can be packaged together or sent separately over the network. In a packet network configuration, the packets can be sent over different hops and received at different times form the server. The server 130 can then reorder the packets based on standard reconstruction techniques.

At step 814, the server 130 analyzes the features and tags (acoustic signal) for sound pressure levels (SPLs) and sound signatures. The server 130 also references the received codeplug information for determining the parameters of the audio modules. For instance, in assessing the SPL levels from the received audio signals or features, the server takes into account any compression or equalization performed during the sound acquisition. The SPL level can then be compensated for based on the front-end processing (e.g., compression, equalization, automatic gain control, filtering). Alternately, if the sound pressure level is calculated by mobile device 160 it can be received by server 130 and stored with the related metadata without further analysis (other than format and other checks to verify data quality). In this example, substantially less information would have to be transmitted.

During the analysis, the server 130 can also scan the audio signals—reconstructed acoustic signals or extracted features—for sound signatures. A sound signature is a specific sound event such as a car horn, a siren, a whistle. Models of sound signatures can be stored in the form of Gaussian Mixture Models (GMMs), Hidden Markov Models (HMMs), or any other statistical based pattern classifiers. Also, the tags can be parsed to determine if the audio signal contains previously learned sound signatures. For instance, the user may textually identify the uploaded acoustic signal as containing a whistle sound. Accordingly, the server 130 can update the sound signature model of the whistle sound with the new audio content. This further strengthens the models ability to recognize a broad range of whistle sounds. Alternatively, if the server 130 does not contain a model of the tagged sound, the server 130 can train a new model to learn the characteristics of the unknown sound. For instance, if the user tags the sound as a 'jackhammer sound' and no models for that sound exist, the server 130 can generate a new model for jackhammers.

Upon detection of a sound signature and SPL levels, the server 130 at step 816 can generate and log a sound analysis report in view of the analysis. The sound analysis report can identify the sound signatures detected, their corresponding SPL levels, and other information such as whether the sound is a threat or the type of sound detected. The report can then be shared with service providers that are interested in data mining the audio content. For example, a restaurant can subscribe to receive audio content ratings for customers having dined in their restaurant. The audio content ratings can include sound level analysis with associated time stamp and any customer related information. This permits the users and owners of the restaurant to assess the sound quality of the restaurant and allows the owners to monitor user feedback related to their experience at the restaurant.

At step 818, the server transmits the report to the mobile device or subscriber by way of the open communication channel, or other means. At step 820 the mobile device presents the details of the report to the user. Aspects of the report can be presented in a visual or audible format, or a combination thereof. For instance, upon automatically capturing a sound pressure level and transmitting the SPL/related information to the server for analysis, the user of the mobile device can then receive a text message warning that the SPL level could be harmful to the user if sustained over a long period of time or that the user should more accurately assess the sound levels of their ambient environment. The mobile device can also audibly present aspects of the report, for example, a threat level of a detected sound signature, and possible instructions for responding. For instance, if a faint fire alarm signal is detected while the user is dining, the mobile device can audibly state a fire alarm was detected and visually present a map for exiting the restaurant, or facility. Understandably, other means of communicating the report can be contemplated in accordance with the teaching of this invention.

FIG. 9 illustrates a simplified GUI 900 that one can use to access sonic landscapes. The GUI can be programmed (e.g., JAVA, C++) to provide options (e.g., map button 920 for map interaction, and address button 930 for address lookup interaction) for acoustic searching based on several parameters (e.g., location, time, topic (e.g., concerts, lectures, cars, boats, airplanes, war zones, historical), and any other identifying topic by which acoustic signals can be tagged and identified). In the non-limiting example illustrated, GUI 900 has a background panel 910 with two buttons, a map button 920 and an address search button 930. A user interface is also illustrated (e.g., mouse 960), that facilitates selection by a user (e.g., movement of cursor 940, over a button 920 or 930, and the pressing (3) of selection button 970) of the available options. For example if a user wishes to search acoustic signals by selecting areas on a map, the user can move 955, the mouse 960 from position (1) to position (2), which respectively moves 950 the cursor 940 from position (1') to position (2'). The user can then select (e.g., highlighted boundary (3')) the map button 920 by pressing (3) on a button 970 built into the mouse 960. For example on the software side, button 920 can have an "onClick" event (e.g., in C++, . . . void_fastcall TForm1::BitBtn1Click(TObject*Sender){ }) associated with opening up 1010 (e.g., C++ ChildForm→Show( ) a child form (i.e., a separate GUI, 1000), where a user can position the cursor and highlight and/or select a region of interest.

FIG. 10 illustrates a world map GUI 1000 in accordance with at least one exemplary embodiment. This is a non-limiting example of a world map that can be opened to provide a user the ability to position a cursor and select a region (e.g., country) of interest.

FIG. 11 illustrates 1100 a user selecting a country using the world GUI 1000 in accordance with at least one exemplary embodiment. A user can move (1155) the user interface 960 (e.g., a mouse) from position (4) to position (5) to move (1150) a cursor on the world map GUI 1000 from position (4') to position (5'). The user can then select a highlighted region (6') by pressing (6) a selection button 970 on user interface 960. Upon the "onClick" event a child form can open 1210 displaying various information (e.g., the current SPL dosage across that region, a geographic map from which to further refine location selection).

Illustrated in FIG. 12 is the current SPL dosage of that region 1200 that one would experience in the standard dosage calculation time frame (e.g., 8 hours, 24 hours) at the present and/or projected SPL levels. Further location refinement is facilitated by specific location button 1220.

FIG. 12 is a non-limiting example only. The SPL Dosage can be calculated by associating pixels in the image with associated geographic extent in the region illustrated. Then the available SPL recordings can be used to calculate an associated SPL average value at the present time and fed into an SPL dosage calculation associated with the geographic regions. For example FIGS. 12A-12D illustrate the process of calculating an average SPL associated with a geographic region and combining average values to obtained a pixel related SPL average value and a pixel related SPL Dosage value that can be plotted as in FIG. 12. For example the SPL Dosage values of each pixel of map FIG. 12A can be calculated by using the available SPL recorded values (e.g., 1340, 1350, 1360) of the geographic regions associated with the pixels. For example FIG. 12B illustrates the various pixels 1310 (e.g., 1330 FIG. 12C) associated with the image. A geographic region of the image 1320 can have many pixels (e.g., 1330). FIG. 12D illustrates SPL sources (SPL1, SPL2, and SPL3) in pixel 1330. An average value of the SPL (e.g., $SPL_{ave}$ 1370) can be calculated from the recorded sources, for example $SPL_{ave}$=(SPL1+SPL2+SPL3)/3. SPL Dosage values can be calculated from SPL average values applied over a selected time frame (e.g., 8 hours). For example equation (A1) can be used to calculate SPL Dosage for this non-limiting example if one makes the assumption that daily noise exposure is SPL Dosage (which it may not be in other examples);

$$D=100C/T \tag{A1}$$

where T is the reference duration at a particular SPL average and C is the total length of a work day. For example if C is 16 hours and SPL Average is 85 dBA then D=100%. If C is 8 hours and SPL average is 85 dBA then D=50%. Note if C is about 24 hours, then an SPL average value of about 82 dBA would give D=100%. Various values of D can be color-coded resulting a color image. For example if D=100% the color can be red. If it is 150% it could be white indicating that in that region it exceeds 100%.

Figure 13:
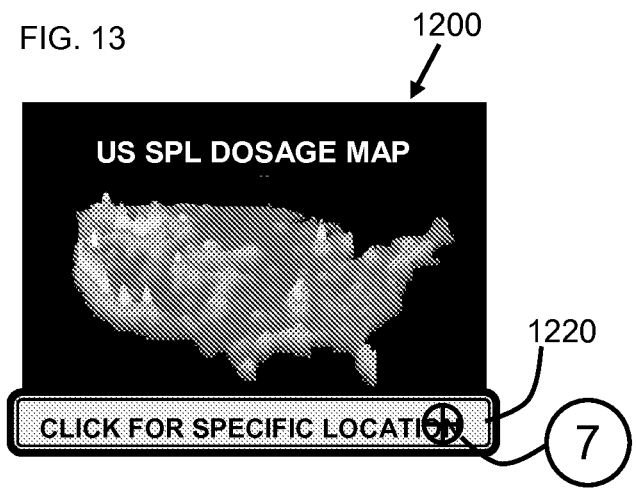
FIG. 13 illustrates a user selecting a location option according to at least one exemplary embodiment.
Figure 14:
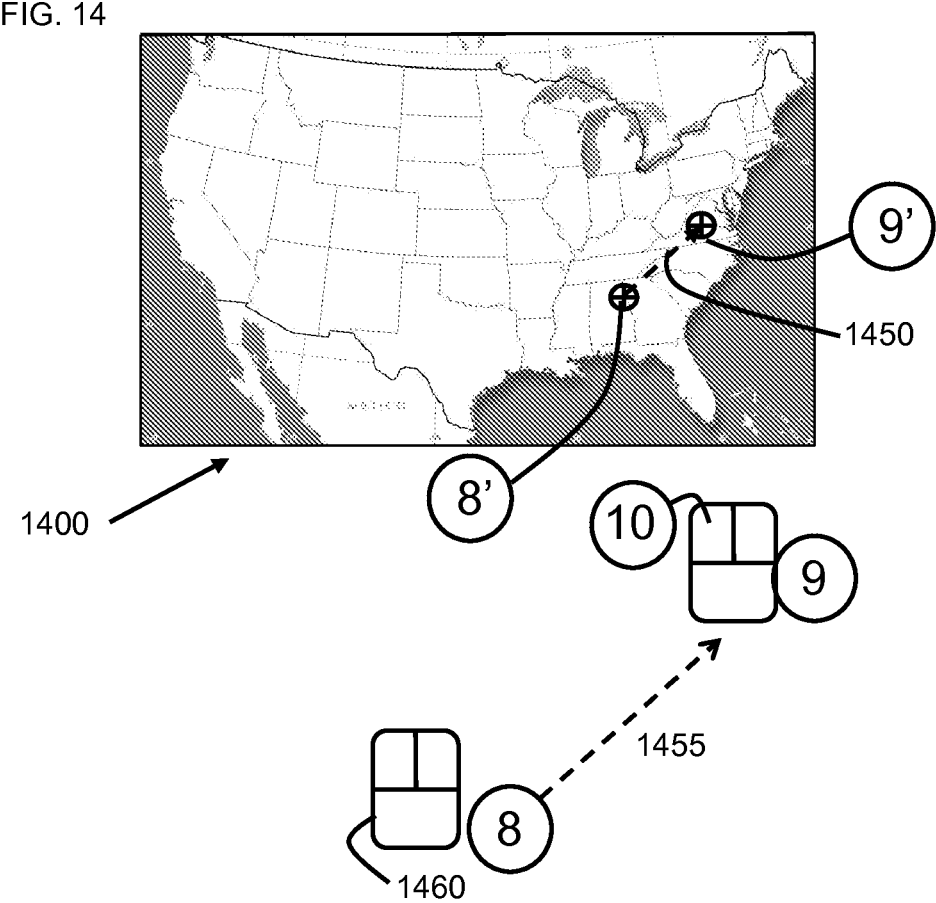
FIG. 14 illustrates a location GUI used to select a map location in accordance with at least one exemplary embodiment.

FIG. 13 illustrates a user selecting a location option according to at least one exemplary embodiment. A location button 1220, associated with GUI 1200, can be selected (7) with a user interface. A more specific location GUI map 1400 can then be displayed FIG. 14, where a user, can then move 1450 a cursor from location (8') to (9') above the location desired, where the move 1450 is associated with moving 1455 a user interface 1460 from location (8) to (9), where the user can select (10) the location associated with the cursor location on the GUI map 1400.

Figure 15:
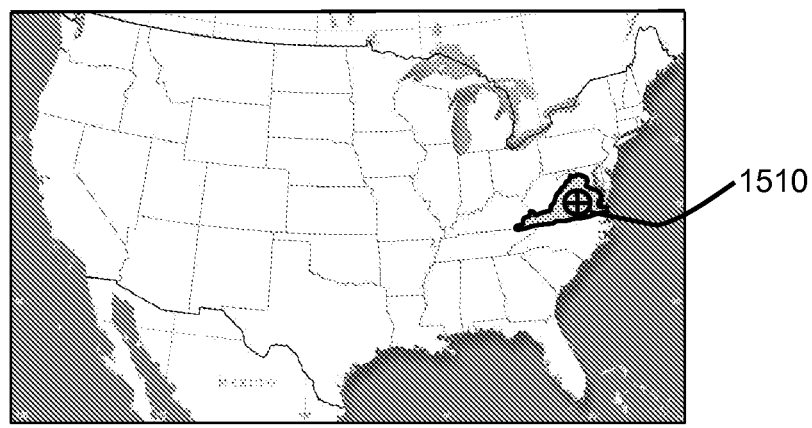
FIG. 15 illustrates a GUI in accordance with at least one exemplary embodiment.
Figure 16:
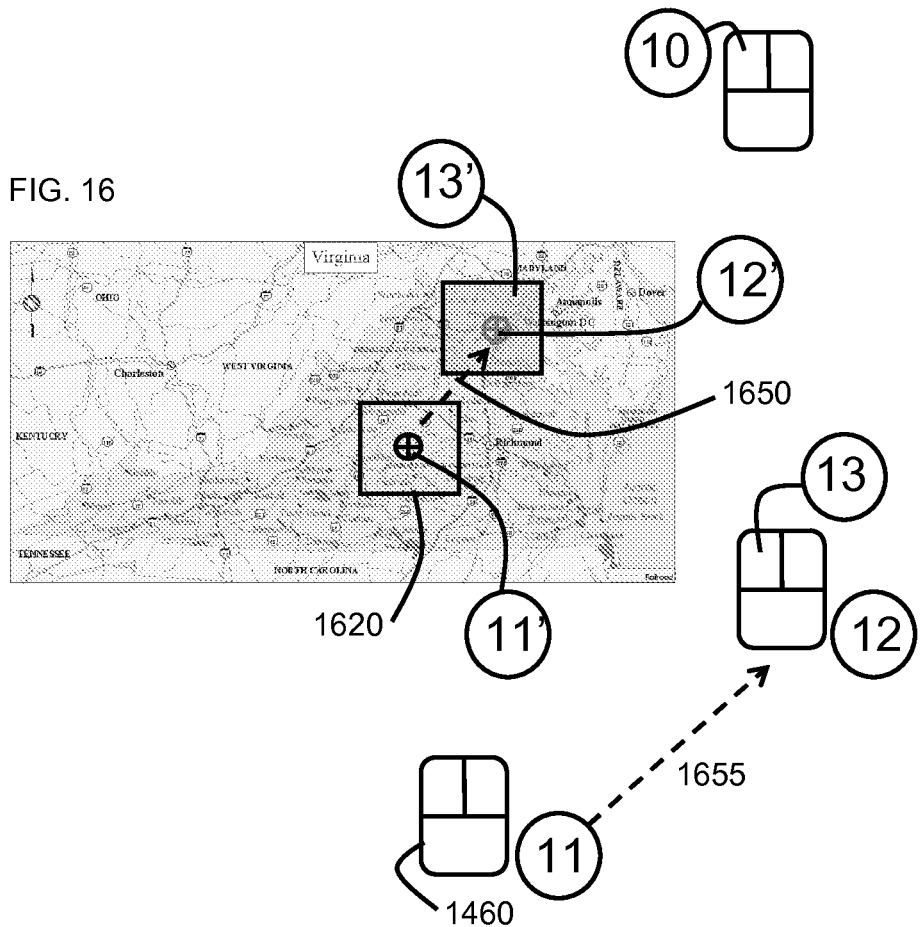
FIG. 16 illustrates a GUI for refining a location selection in accordance with at least one exemplary embodiment.

FIG. 15 illustrates a GUI in accordance with at least one exemplary embodiment. FIG. 15 illustrates a highlighted region (1510 e.g., Virginia) that has been selected (10) by a user. Upon selection, a closer map of the selected region can be displayed in an interactive GUI as illustrated in FIG. 16. To illustrate that various display options fall within the scope of at least one exemplary embodiment, a user centers a sub-regional extent 1620 about the cursor location indicating the next extent of any closer view selection. A user can use the user interface 1460 to move 1650 a cursor from position (11') to position (12') corresponding to movement 1655 of a user interface from position (11) to position (12). A user can then select (13) the closer view the region about the current position of the cursor, which for example can be indicated by a changing of the color of the surrounding region (13'). Note that other indications of selection can be used and the discussion herein is only for illustrative purposes.

Figure 17:
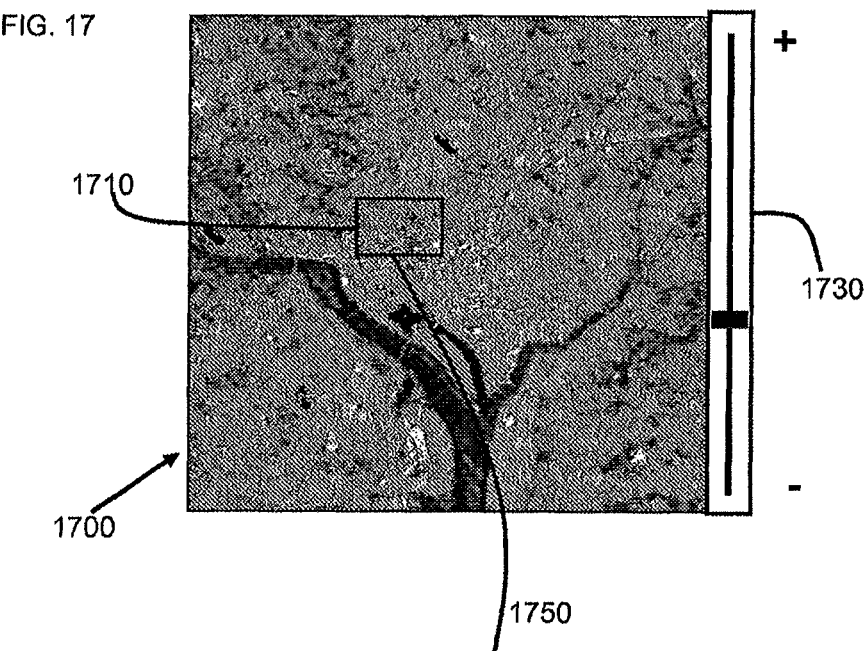
FIG. 17 illustrates a GUI for selecting a location in a city in accordance with at least one exemplary embodiment.

FIG. 17 illustrates a GUI 1700 for selecting a location in a city in accordance with at least one exemplary embodiment. Note that this embodiment illustrates a zoom bar 1730 that a user can use to increase or decrease resolution. For example an increase in resolution can be indicated by a rectangular 1710 extent of the view that would be displayed in a similar size image as the GUI's image. Upon selection of the resolution the image in 1710 can be displayed (e.g., opening 1750 of a child form) such as illustrated in FIG. 18.

Figure 18:
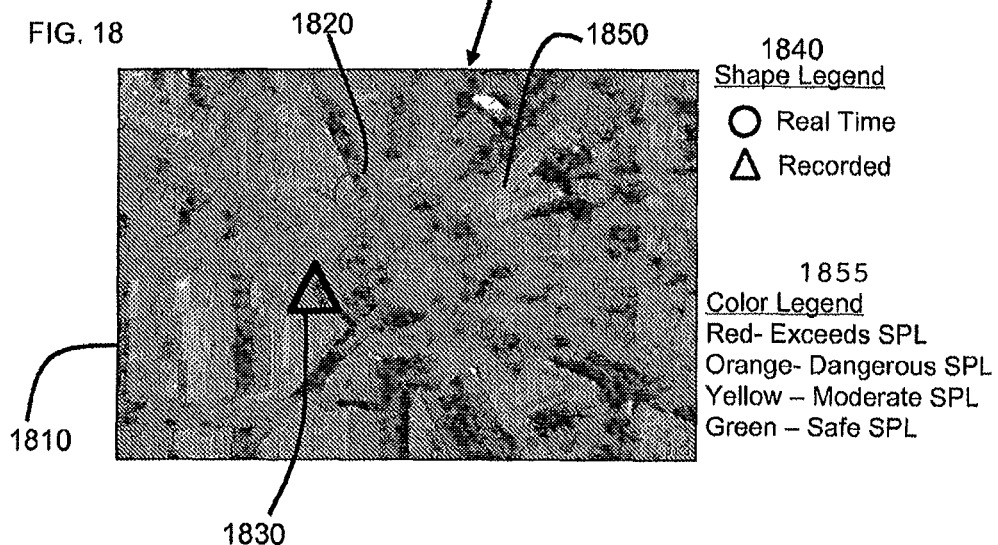
FIG. 18 illustrates a GUI illustrating various available acoustic signals in accordance with at least one exemplary embodiment.

FIG. 18 illustrates a GUI 1810 illustrating various available acoustic signals in accordance with at least one exemplary embodiment. Note that there can be various methods (e.g., symbols, lights, shapes, colors) that can be used to indicate location of the sound recording, type of sound recording (e.g., different shapes for different topics such as vehicles), intensity of the sound signal of the sound recording (e.g., colors, shapes), and indication of whether the recording is real time or old (e.g., symbols such as shown in shape legend 1840). The non-limiting example illustrated in FIG. 18 indicates circles 1820, 1850 for real time recordings and triangle 1830 for a recording, where real time can be set to be any recording that has an end time a Dt from eth present time. For example any recording within 30 minutes of the present time can be considered a real time recording, note that the time can vary and be as short as fractions of a second to days. Also colors (such as shown in color legend 1855) are associated with the shape in this non-limiting example to illustrate the sound intensity of the sound recording at the recoding location.

Figure 19:
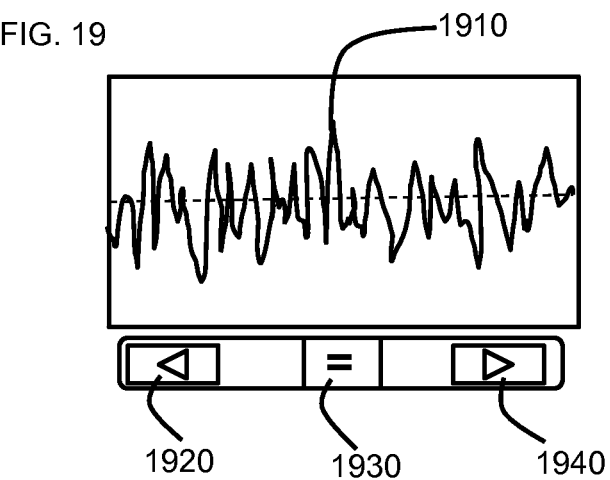
FIG. 19 illustrates the selection of an acoustic signal to listen to in accordance with at least one exemplary embodiment.

At least one exemplary embodiment plays the sound associated with a symbol by passing the cursor on the symbol, at which time the software (e.g., C++ OnEnter event) activates a media player and loads a sound recording associated with the pixel locations associated with the symbol and stop upon movement of the cursor off of the symbol (e.g., C++ OnExit event). Note that the media player can optionally be displayed. Additionally a user can click on the symbol to play (e.g., C++ OnClick event). For example FIG. 19 illustrates a media player set to play the selected sound recording. The sound recording 1910 can be displayed mono or stereo. The user can control the sound recording's play 1940, reverse 1920 or pause 1930. Note that other exemplary embodiments can have other media players and exemplary embodiments are not restricted by the type of media player, nor whether the media player is visually displayed or not.

Figure 20:
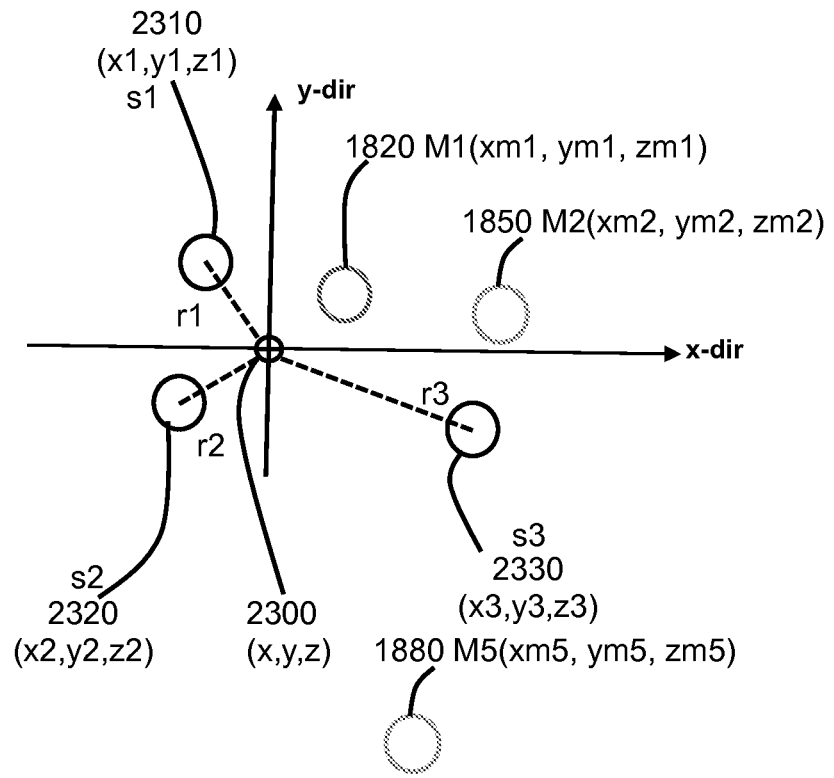
FIG. 20 illustrates a listening locations relation to sound recordings and estimated source locations in accordance with at least one exemplary embodiment.

FIG. 20 illustrates the source signals from FIG. 18 and the associated source signals that generated the sound recordings (1820 and 1850) (as well as recording 1880). Note that the sound recorded by microphones at 1820 and 1850 can be from multiple sources (e.g., 2310, 2320, and 2330). Note that the sound recordings do not necessarily indicate source locations. A recording at intensity I at x, y, z can be due to a source of intensity I0 at a radius r. Thus the source location is not uniquely identified. Three recordings or more (e.g., M1, M2, M5), where the source intensity can be separated from microphone recordings can be used to uniquely identify the location of the source signal (e.g., s1 2310). Note that the source intensity and location may be needed, presenting four unknowns, for example (source, xsource, ysource, and zsource. For example a source signal can be identified in M1, M2, and M5 by looking for frequency dependencies in the sound recordings (e.g., M1, M2, and M5) that have similar coherence. High coherence frequency bands can be used to identify and match frequency intensities due to similar signals. Matched frequency bands can be used based upon intensity of the recordings in those bands and the location of the recordings to convolve the source location and approximate intensity for those bands. Then estimated source signals (e.g., 2310, 2320, 2330) can be composed along with location. The source signals 2310, 2320, and 2330 can then be used to approximate the sound at a user selected location 2300 (x, y, z). Note that the methodology discussed herein is an example of one method of generating the acoustic source at a chosen location. There can be others within the scope of exemplary embodiments.

Figure 21:
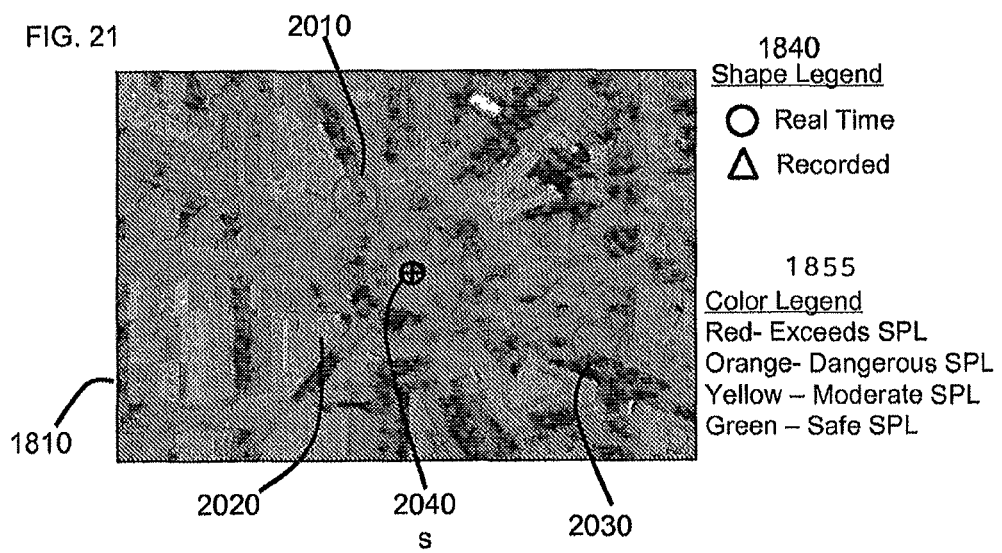
FIG. 21 illustrates calculated source signals from the available sound recordings in the listening area in accordance with at least one exemplary embodiment.

FIG. 21 illustrates source signals from the available sources in the listening area in accordance with at least one exemplary embodiment. For example sources 2010, 2020, and 2030 have been located on GUI 1810, and can be used to estimate the sound(s) that a user would hear at a selected position 2040.

Figure 22:
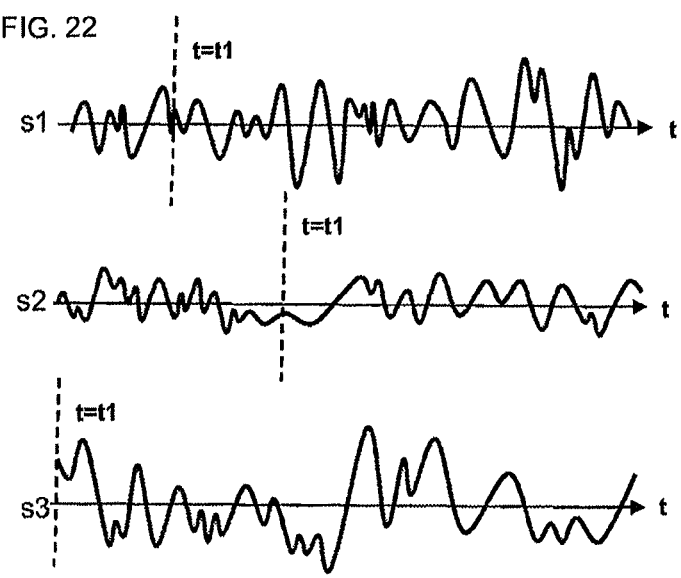
FIG. 22 illustrates calculated source signals in accordance with at least one exemplary embodiment.
Figure 23:
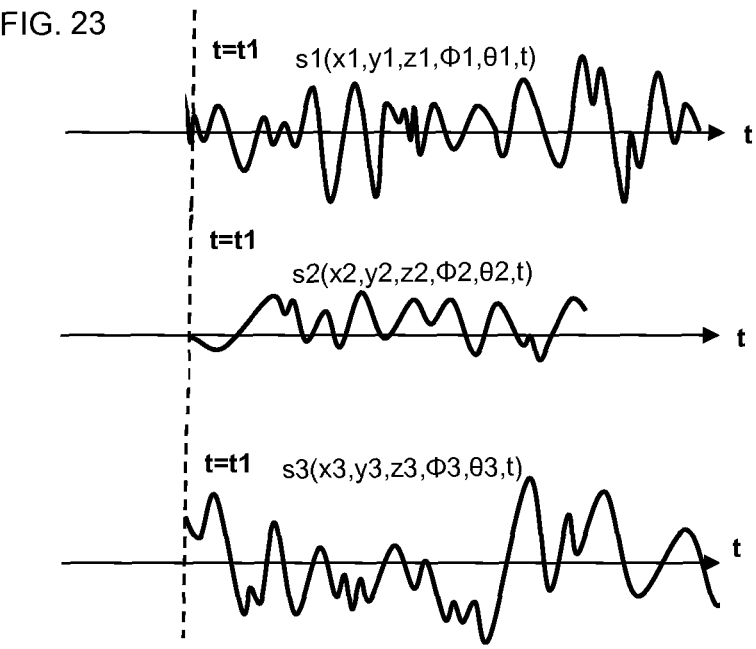
FIG. 23 illustrates time matching the sound sources.

FIG. 22 illustrates source signals, s1, s2, and s3. A user that has selected a location (x, y, z) and a time t1, can use the sources to compose a sound recording that is associated with x, y, z, and t1. Note that in one exemplary embodiment the method for combination matches the various sources (s1, s2, and s3) at start time t1, FIG. 23.

Figure 24:
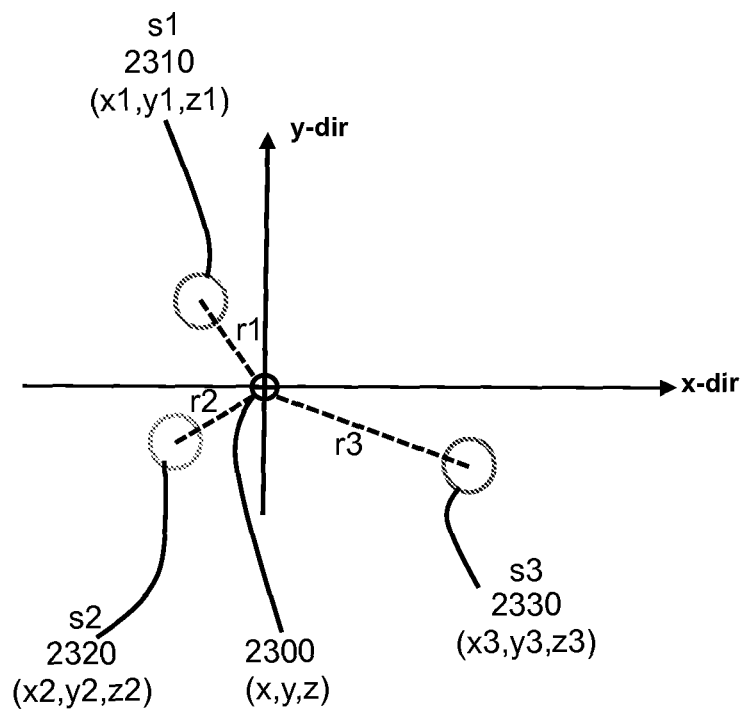
FIG. 24 illustrates the user selected user location and its relation to the calculated source signals in accordance with at least one exemplary embodiment.
Figure 25:
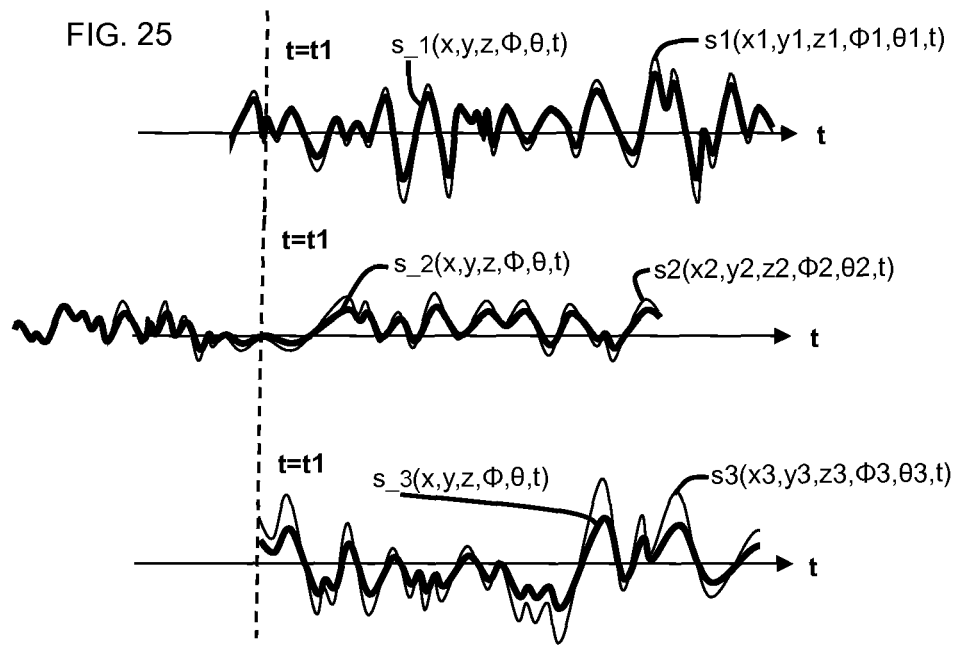
FIG. 25 illustrates the intensity varied source signals based on source distances distance from a chosen listening position.

The source recording associated with the selected position (x, y, z) can be composed by calculating the radial distance (e.g., r1, r2, and r3) (see FIG. 24), used to modify intensities of the sources at x, y, and z and modifying the time delay associated with the sources. For example if source s1 2310 is emitting a sound signal at t1, it will arrive at the selected position 2300 with a time delay based upon the speed of sound. Likewise other sources 2320 and 2330 will have a time delay from t1 to location 2300. Note also that the source signals S1, S2, and S3, can also be identified in M1, M2, and M3 by not only looking for high coherence but also time delays in the temporal recordings to help locate the location of the sources (e.g., via time delay between various microphone measurements). The radial distance can be used to modify the expected intensity of the sound sources at 2300 (FIG. 25).

Figure 26:
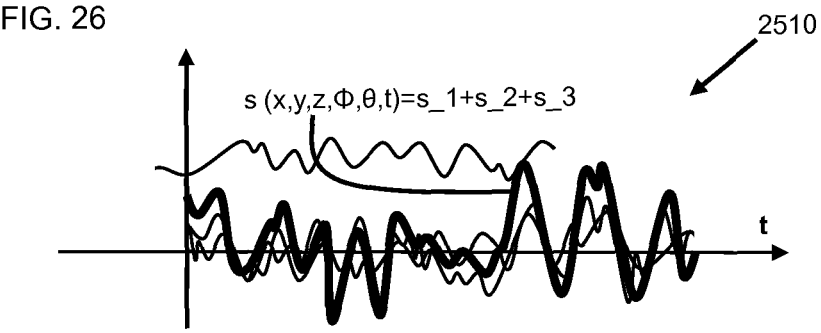
FIG. 26 illustrates a source signal for the listening location, which includes the modeled signals from the available source signals in accordance with at least one exemplary embodiment.

The modified signals can be combined to create the estimated sound recording 2510 at 2300 (FIG. 26).

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention are not so limited. Numerous modifications, changes, variations, substitutions and equivalents will occur to those skilled in the art without departing from the spirit and scope of the present embodiments of the invention as defined by the appended claims.

What is claimed is:

1. A method of using a mobile device comprising the steps of:
   capturing acoustic information from a microphone of the mobile device;
   configuring audio processing of the captured acoustic information according to a predetermined criteria;
   detecting a trigger event from the captured acoustic information, the trigger event including a predetermined sound signature; and
   when the trigger event is detected:
      measuring a sound pressure level from the captured acoustic information, and
      providing metadata corresponding to the measured sound pressure level including time information and geographic information.

2. The method of using the mobile device as recited in claim 1 further including a step of adjusting the measuring of the sound pressure level to compensate for a microphone directional pattern.

3. The method of using the mobile device as recited in claim 1 further including a step of adjusting the measuring of the sound pressure level to compensate for a microphone port.

4. The method of using the mobile device as recited in claim 1 further including a step of adjusting the measuring of the sound pressure level to account for an amplifier gain.

5. The method of using the mobile device as recited in claim 1 where the step of configuring audio processing further includes a step of providing a bypass signal path for the acoustic information around audio processing circuitry in the mobile device.

6. The method of using the mobile device as recited in claim 1 where the step of configuring audio processing further includes a step of disabling automatic gain control circuitry when measuring the sound pressure level.

7. The method of using the mobile device as recited in claim 1 where the step of configuring audio processing further includes a step of disabling equalization circuitry when measuring the sound pressure level.

8. The method of using the mobile device as recited in claim 1 further including a step of sending the measured sound pressure level and the metadata to a database.

9. The method of using the mobile device as recited in claim 1 further including a step of converting the captured acoustic information to a digital signal, the sound pressure level being measured from the digital signal.

10. The method of using the mobile device as recited in claim 1 where the step of measuring the sound pressure level includes measuring the sound pressure level from the captured acoustic information responsive to the audio processing.

11. The method of using the mobile device as recited in claim 1 where the audio processing includes at least one of amplification, automatic gain control, equalization, audio compression or feature extraction.

12. The method of using the mobile device as recited in claim 1 further including measuring a sound pressure level prior to detecting the trigger event, and collecting the measured sound pressure level responsive to the trigger event, where the trigger event further includes at least one of a predetermined sound pressure level threshold or a predetermined change in a sound pressure level value.

13. A mobile device comprising:
   a microphone configured to capture acoustic information;
   an audio processing circuitry coupled to the microphone and configured to perform audio processing of the captured acoustic information; and
   a processor operably coupled to the audio processing circuitry and the microphone, the processor configured to measure a sound pressure level via the microphone, where the audio processing circuitry is bypassed when the sound pressure level is measured,
   where the processor is configured to detect a trigger event from the captured acoustic information, the sound pressure level being measured responsive to the detected trigger event, the trigger event including a predetermined sound signature.

14. The mobile device as recited in claim 13 where the microphone is configured to be positioned outside of a housing of the mobile device when measuring the sound pressure level from an ambient environment.

15. The mobile device as recited in claim 13 where the microphone includes a boom microphone configured to be positioned away from a housing of the mobile device when the sound pressure level is measured.

16. The mobile device as recited in claim 13 where the microphone is an omni-directional microphone.

17. The mobile device as recited in claim 13 where the mobile device has more than one microphone.

18. The mobile device as recited in claim 13 further including:
- a clock for providing time information when the sound pressure level is measured; and
- a global positioning system (GPS) receiver for providing geographic location information when the sound pressure level is measured and where the time information and the geographic location information is provided with the measured sound pressure level.

19. The mobile device as recited in claim 13 where the processor is operably coupled to a data communication system for sending the measured sound pressure level to a database.

20. The mobile device as recited in claim 13 where the processor disables the audio processing circuitry when the sound pressure level is measured.

21. The mobile device as recited in claim 13 further including an analog to digital converter to convert the captured acoustic information from the microphone to a digital signal, the sound pressure level being measured from the digital signal.

22. The mobile device as recited in claim 13 where the audio processing circuitry includes at least one of an amplifier, an automatic gain controller, an equalizer, an audio compressor or a feature extractor.

23. The mobile device as recited in claim 13, where the processor is configured to measure a sound pressure level prior to detecting the trigger event, and is configured to collect the measured sound pressure level responsive to the trigger event, where the trigger event further includes at least one of a predetermined sound pressure level threshold or a predetermined change in a sound pressure level value.

\* \* \* \* \*